United States Patent
Yan et al.

(10) Patent No.: US 9,641,917 B2
(45) Date of Patent: May 2, 2017

(54) OPTICAL COMMUNICATIONS APPARATUS AND METHOD

(71) Applicant: Huawei Technologies Co., Ltd., Shenzhen (CN)

(72) Inventors: Yunfei Yan, Shenzhen (CN); Zhiyong Feng, Shenzhen (CN); Han Zhao, Shenzhen (CN); Liangjia Zong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/331,268

(22) Filed: Oct. 21, 2016

(65) Prior Publication Data

US 2017/0041689 A1 Feb. 9, 2017

Related U.S. Application Data

(63) Continuation of application No. PCT/CN2014/075969, filed on Apr. 22, 2014.

(51) Int. Cl.
*H04J 14/00* (2006.01)
*H04J 14/02* (2006.01)
(Continued)

(52) U.S. Cl.
CPC ..... *H04Q 11/0062* (2013.01); *H04Q 11/0005* (2013.01); *G02B 6/266* (2013.01);
(Continued)

(58) Field of Classification Search
CPC ...... G02B 6/2931; G02B 6/266; G02B 6/262; G02B 6/2713; H04Q 11/0062;
(Continued)

(56) References Cited

U.S. PATENT DOCUMENTS

| 6,097,859 A | 8/2000 | Solgaard et al. |
| 7,019,883 B2 * | 3/2006 | Moon ..................... G02B 6/262 359/290 |

(Continued)

FOREIGN PATENT DOCUMENTS

| CN | 103401609 A | 11/2013 |
| KR | 100712896 B1 | 4/2007 |
| KR | 20070066375 A | 6/2007 |

*Primary Examiner* — Ken N Vanderpuye
*Assistant Examiner* — Abbas H Alagheband
(74) *Attorney, Agent, or Firm* — Leydig, Voit & Mayer, Ltd.

(57) ABSTRACT

Embodiments of the present invention provide an optical communications apparatus, where the apparatus includes: an input system, a first optical switch array, and an output system, where the input system includes N input ports that are one-dimensionally arranged on a first plane, a first beam expander, a demultiplexer, and a first optical path changer; the first optical switch array includes N×K first optical switch units that are two-dimensionally arranged on a second plane, and the first optical switch units can rotate in a first axial line direction and a second axial line direction; and the output system includes a second optical path changer, a second beam expander, a second optical switch array, and M output ports that are two-dimensionally arranged.

19 Claims, 11 Drawing Sheets

(51) Int. Cl.
  *H04B 10/24* (2006.01)
  *G02B 6/28* (2006.01)
  *G02B 6/42* (2006.01)
  *G02B 6/26* (2006.01)
  *H04Q 11/00* (2006.01)
  *G02B 6/293* (2006.01)
  *G02B 6/27* (2006.01)

(52) U.S. Cl.
  CPC .......... *G02B 6/2713* (2013.01); *G02B 6/2931* (2013.01); *H04Q 2011/009* (2013.01); *H04Q 2011/0037* (2013.01); *H04Q 2011/0052* (2013.01)

(58) Field of Classification Search
  CPC ....... H04Q 11/0005; H04Q 2011/0037; H04Q 2011/0052; H04Q 2011/009
  USPC .................................... 398/50, 88, 41, 83
  See application file for complete search history.

(56) References Cited

U.S. PATENT DOCUMENTS

| | | | | |
|---|---|---|---|---|
| 7,027,684 B2* | 4/2006 | Ducellier | ........... | G02B 6/12011 385/15 |
| 7,088,882 B2* | 8/2006 | Ducellier | ........... | G02B 6/12011 385/17 |
| 7,236,660 B2* | 6/2007 | Ducellier | ........... | G02B 6/12011 385/16 |
| 7,302,134 B2* | 11/2007 | Ducellier | ........... | G02B 6/12011 385/18 |
| 7,447,403 B2* | 11/2008 | Kirk | ........... | G02B 6/12007 385/15 |
| 7,702,194 B2* | 4/2010 | Presley | ........... | G02B 6/3548 359/872 |
| 7,720,329 B2* | 5/2010 | Presley | ........... | G02B 6/29385 385/16 |
| 7,769,255 B2* | 8/2010 | Nagy | ........... | G02B 6/29311 385/16 |
| 7,873,246 B2* | 1/2011 | Nagy | ........... | G02B 6/29311 385/18 |
| 8,000,568 B2* | 8/2011 | Presley | ........... | G02B 6/29311 359/872 |
| 8,111,995 B2 | 2/2012 | Wisseman | | |
| 8,121,482 B2* | 2/2012 | Khan | ........... | G02B 6/29311 385/24 |
| 8,131,123 B2* | 3/2012 | Presley | ........... | G02B 6/29311 385/16 |
| 8,634,129 B2* | 1/2014 | Watanabe | ........... | G02B 6/356 359/318 |
| 2002/0131688 A1* | 9/2002 | Chen | ........... | G02B 6/2931 385/24 |
| 2002/0131690 A1* | 9/2002 | Belser | ........... | G02B 6/2931 385/24 |
| 2002/0131691 A1* | 9/2002 | Garrett | ........... | G02B 6/2931 385/24 |
| 2002/0164114 A1* | 11/2002 | Golub | ........... | G02B 6/266 385/18 |
| 2002/0176151 A1* | 11/2002 | Moon | ........... | G02B 6/262 359/298 |
| 2003/0011769 A1* | 1/2003 | Rakuljic | ........... | G02B 6/2713 356/328 |
| 2003/0095305 A1* | 5/2003 | Kewitsch | ........... | G02B 6/2713 398/41 |
| 2003/0095743 A1* | 5/2003 | Fabiny | ........... | G02B 6/29307 385/24 |
| 2003/0190113 A1* | 10/2003 | Huang | ........... | G02B 6/3586 385/18 |
| 2003/0206685 A1* | 11/2003 | Huang | ........... | H04Q 11/0005 385/18 |
| 2004/0033010 A1* | 2/2004 | McGuire, Jr. | ........... | G02B 6/3592 385/16 |
| 2004/0136648 A1* | 7/2004 | Chen | ........... | G02B 6/2931 385/24 |
| 2004/0136718 A1* | 7/2004 | McGuire | ........... | G02B 6/2931 398/88 |
| 2004/0156581 A1* | 8/2004 | Golub | ........... | G02B 6/266 385/18 |
| 2004/0165828 A1* | 8/2004 | Capewell | ........... | G02B 6/29367 385/47 |
| 2005/0249458 A1* | 11/2005 | Sasaki | ........... | G02B 6/2931 385/24 |
| 2006/0067611 A1* | 3/2006 | Frisken | ........... | G02B 6/272 385/16 |
| 2006/0182387 A1* | 8/2006 | McGuire | ........... | G02B 6/3592 385/16 |
| 2006/0228072 A1* | 10/2006 | Davis | ........... | G02B 6/29311 385/18 |
| 2007/0104418 A1* | 5/2007 | McGuire, Jr. | ........... | G02B 6/3592 385/16 |
| 2007/0160321 A1* | 7/2007 | Wu | ........... | G02B 6/12021 385/24 |
| 2008/0031627 A1* | 2/2008 | Smith | ........... | G02B 6/2931 398/83 |
| 2008/0205821 A1* | 8/2008 | McGuire | ........... | G02B 6/3592 385/17 |
| 2008/0218872 A1* | 9/2008 | Yuan | ........... | G02B 6/2931 359/663 |
| 2009/0028502 A1* | 1/2009 | Presley | ........... | G02B 6/29385 385/18 |
| 2009/0028503 A1* | 1/2009 | Garrett | ........... | G02B 6/29311 385/18 |
| 2009/0103861 A1* | 4/2009 | Presley | ........... | G02B 6/3548 385/16 |
| 2009/0110349 A1* | 4/2009 | Presley | ........... | G02B 6/29311 385/17 |
| 2009/0231580 A1* | 9/2009 | Nagy | ........... | G02B 6/29311 356/326 |
| 2009/0232446 A1* | 9/2009 | Nagy | ........... | G02B 6/29311 385/18 |
| 2009/0304328 A1* | 12/2009 | Presley | ........... | G02B 6/29311 385/16 |
| 2012/0002917 A1 | 1/2012 | Colbourne | | |
| 2012/0057869 A1 | 3/2012 | Colbourne | | |
| 2013/0038917 A1* | 2/2013 | Watanabe | ........... | G02B 6/356 359/225.1 |

\* cited by examiner

200

```
┌─────────────────────────────────────────────────────────────────────────┐
│ Receive target signal light by using a target input port, where a flare of the target │
│ signal light is a circle, and the target signal light includes at least two beams of  │ S210
│                         sub-target signal light                                       │
└─────────────────────────────────────────────────────────────────────────┘
                                        ↓
┌─────────────────────────────────────────────────────────────────────────┐
│ Perform first beam expansion processing on the target signal light, so as to          │
│ change the flare that is in a direction of a second plane and that is of the target   │
│ signal light from the circle to an ellipse, where a major axis direction of the       │
│ ellipse is a second axial line direction, a minor axis direction of the ellipse is a  │
│ first axial line direction, and a major axis length of the ellipse is determined      │ S220
│ based on the following parameters: bandwidth of the target signal light, a spacing    │
│ between the at least two beams of sub-target signal lights, a wavelength of sub-      │
│ target signal light that is located at a bandwidth center position of the target      │
│ signal light and that is of the at least two beams of sub-target signal lights, and   │
│                      diffraction parameters of a demultiplexer                        │
└─────────────────────────────────────────────────────────────────────────┘
                                        ↓
┌─────────────────────────────────────────────────────────────────────────┐
│ Perform demultiplexing processing on the target signal light by using the             │
│ demultiplexer, to obtain the at least two beams of sub-target signal lights by        │ S230
│ splitting the target signal light, so that the sub-target signal lights disperse on a │
│                                  third plane                                          │
└─────────────────────────────────────────────────────────────────────────┘
                                        ↓
┌─────────────────────────────────────────────────────────────────────────┐
│ Perform first optical path change processing on the sub-target signal lights, so      │
│ that the sub-target signal lights are incident, parallel to each other, into          │ S240
│                   corresponding first optical switch units                            │
└─────────────────────────────────────────────────────────────────────────┘
                                        ↓
┌─────────────────────────────────────────────────────────────────────────┐
│ Based on output ports corresponding to the sub-target signal lights, control          │
│ rotation of the first optical switch units that correspond to the sub-target signal   │ S250
│ lights and that are in a first optical switch array, so as to transmit the sub-target │
│             signal lights to corresponding second optical switch units                │
└─────────────────────────────────────────────────────────────────────────┘
                                        ↓
┌─────────────────────────────────────────────────────────────────────────┐
│ Perform second optical path change processing on the sub-target signal lights, so     │
│ that a projection that is on the third plane and that is of the sub-target signal light│
│ on which the second optical path change processing has been performed is              │ S260
│ parallel to a projection that is on the third plane and that is of the corresponding  │
│          sub-target signal light before the first optical path change processing      │
└─────────────────────────────────────────────────────────────────────────┘
                                        ↓
┌─────────────────────────────────────────────────────────────────────────┐
│ Perform second beam expansion processing on the sub-target signal lights, so as       │
│ to change flares that are in the direction of the second plane and that are of the    │ S270
│ sub-target signal lights from ellipses to circles, where diameters of the circles are │
│           determined based on a transmission requirement of the output ports          │
└─────────────────────────────────────────────────────────────────────────┘
                                        ↓
┌─────────────────────────────────────────────────────────────────────────┐
│ Control rotation of the second optical switch units that correspond to the sub-       │
│ target signal lights and that are in a second optical switch array, so as to transmit │ S280
│                   the sub-target signal lights to corresponding output ports          │
└─────────────────────────────────────────────────────────────────────────┘
```

FIG. 10

OPTICAL COMMUNICATIONS APPARATUS AND METHOD

CROSS-REFERENCE TEMPLATES

This application is a continuation of International Application No. PCT/CN2014/075969, filed on Apr. 22, 2014, the disclosure of which is hereby incorporated by reference in its entirety.

TECHNICAL FIELD

The embodiments of the present invention relates to the communications field, and in particular, to an optical communications apparatus and method.

BACKGROUND

With a rapid growth of video services and cloud services, operators pay special attention to flexibility of optical network construction, and reduction of costs of construction, operation, and maintenance of an optical network. There are increasingly more direction dimensions (or, transmission paths) on which a network node needs to be cross-connected. Instead of performing previous manual exchange of an optical fiber connection, an operator can remotely and automatically perform dimension switching or the like by using a reconfigurable optical add/drop multiplexer (ROADM), thereby satisfying a dynamic network connection need.

Currently, it is known that, an ROADM has N input ports that are one-dimensionally arranged, M output ports that are one-dimensionally arranged, and two levels of optical switch arrays; and can split a wavelength division multiplexing (WDM) signal, which is from each input port, into K sub-signals by using a grating, switch each sub-signal to a corresponding optical switch unit in a second-level optical switch array (which has M×K optical switch units that are two-dimensionally arranged) by using a first-level optical switch array (which has N×K optical switch units that are two-dimensionally arranged), can combine sub-signals into a WDM signal by using the grating, where the sub-signals are from the second-level optical switch array, have different wavelengths, and correspond to a same output port, and can transmit the WDM signal to the corresponding output port, so as to complete network cross connect.

To adapt to needs of a high-speed optical communications network for high efficiency and flexibility, the ROADM, which is used as a core of network cross connect, needs to develop constantly, and it is intended that the ROADM can have more output ports, to implement crossing of signals of more output dimensions. As described above, in a case in which a crossing capability (for example, a rotation range) of a single optical switch is enough, a quantity K of sub-signals included in the WDM signal (specifically, a quantity of wavelengths of the included sub-signals) is relatively large and is relatively fixed, and therefore, a crossing capability that is of the ROADM and that is for an input end mainly depends on a quantity, that is M, of optical switch units that are in the second-level optical switch array and that correspond to the output ports. Limited by configuration space, the crossing capability of the single optical switch unit, and the like, M cannot increase infinitely, which cannot satisfy currently increasing quantities of network needs and user requirements.

Therefore, it is intended to provide a technology that can improve, within given limited configuration space, a network cross connect capability that is of the ROADM and that is for an output end.

SUMMARY

Embodiments of the present invention provide an optical communications apparatus and method, which can improve, within given limited configuration space, a network cross connect capability for an output end, and then satisfy network needs and user requirements.

According to a first aspect, an optical communications apparatus is provided, where the apparatus includes: an input system, a first optical switch array, and an output system, where the input system includes N input ports that are one-dimensionally arranged on a first plane, a first beam expander, a demultiplexer, and a first optical path changer; the first optical switch array includes N×K first optical switch units that are two-dimensionally arranged on a second plane, where K is a quantity of sub-signal lights that are included in signal light, center wavelengths of the sub-signal lights are different from each other, the second plane is perpendicular to a main axis direction, the main axis direction is a transmission direction of signal light that is output from the input ports, the first plane is perpendicular to the second plane, the first optical switch units can rotate in a first axial line direction and a second axial line direction, the first axial line direction is a direction of an intersecting line between the first plane and the second plane, the second axial line direction is a direction of an intersecting line between a third plane and the second plane, the third plane is perpendicular to the second plane, the third plane is perpendicular to the first plane, one first optical switch unit is configured to receive only one beam of sub-signal light that is from one input port, and input ports or sub-signal lights corresponding to the first optical switch units are different from each other; and the output system includes a second optical path changer, a second beam expander, a second optical switch array, and M output ports that are two-dimensionally arranged, where the second switch array includes M second optical switch units that are two-dimensionally arranged, one second optical switch unit is configured to receive, within a same period of time, only one piece of sub-signal light that is from a same input port, the second optical switch units can rotate at least in the second axial line direction, and the second optical switch units correspond one-to-one to the output ports, where a target input port of the N input ports is configured to: when receiving target signal light, transmit the target signal light to the first beam expander, where a flare of the target signal light that is output by the target input port is a circle, and the target signal light includes at least two beams of sub-target signal lights; the first beam expander is configured to perform first beam expansion processing on the target signal light, so as to change the flare that is in a direction of the second plane and that is of the target signal light from the circle to an ellipse, and transmit the target signal light on which the first beam expansion processing has been performed to the demultiplexer, where a major axis direction of the ellipse is the second axial line direction, a minor axis direction of the ellipse is the first axial line direction, and a major axis length of the ellipse is determined based on the following parameters: bandwidth of the target signal light, a spacing between adjacent sub-target signal lights of the at least two beams of sub-target signal lights, center wavelengths of the at least two beams of sub-target signal lights, and diffraction parameters of the demultiplexer; the demultiplexer is configured to perform demultiplexing processing on the target signal light, to obtain the at least two beams of sub-target signal lights by splitting the target signal light, so that the sub-target signal lights disperse on the third plane, and transmit the sub-target signal lights to corresponding first optical switch units by using the first optical path changer; the first optical path changer is configured to perform first optical path change processing on the sub-target signal lights, so that the sub-target signal lights are incident, parallel to each other, into the corresponding first optical switch units; the first optical switch array is configured to: based on output ports corresponding to the sub-target signal lights, control rotation of the first optical switch units corresponding to the sub-target signal lights, so as to transmit the sub-target signal lights to corresponding second optical switch units by using the second optical path changer and the second beam expander; the second optical path changer is configured to perform second optical path change processing on the sub-target signal lights, where a projection that is on the third plane and that is of the sub-target signal light on which the second optical path change processing has been performed is parallel to a projection that is on the third plane and that is of the corresponding sub-target signal light before the first optical path change processing; the second beam expander is configured to perform second beam expansion processing on the sub-target signal lights, so as to change flares that are in the direction of the second plane and that are of the sub-target signal lights from ellipses to circles, where diameters of the circles are determined based on a transmission requirement of the output ports; and the second optical switch array is configured to control rotation of the second optical switch units corresponding to the sub-target signal lights, so as to transmit the sub-target signal lights to corresponding output ports.

With reference to the first aspect, in a first implementation manner of the first aspect, the output system further includes: a multiplexer, located between the second optical path changer and the second beam expander, and configured to: when for one output port, there are at least two beams of sub-target signal lights that need to be received, combine the at least two beams of sub-target signal lights that need to be received into one beam of signal light, and transmit the one beam of signal light to the second optical switch array by using the second beam expander; or configured to: when for one output port, there is only one beam of sub-target signal lights that needs to be received, adjust optical power distribution within a bandwidth range of the sub-target signal lights.

With reference to the first aspect and the foregoing implementation manner of the first aspect, in a third implementation manner of the first aspect, the demultiplexer and the multiplexer are at least one grating.

With reference to the first aspect and the foregoing implementation manners of the first aspect, in a fourth implementation manner of the first aspect, the multiplexer and the demultiplexer share the at least one grating.

With reference to the first aspect and the foregoing implementation manners of the first aspect, in a fifth implementation manner of the first aspect, the first beam expander is further configured to perform first beam expansion processing on the target signal light, so that a beam waist position that is of the target signal light, on the third plane, and between the first beam expander and the first optical path changer is located on the demultiplexer.

With reference to the first aspect and the foregoing implementation manners of the first aspect, in a sixth implementation manner of the first aspect the second beam expander is further configured to perform second beam expansion processing on the sub-target signal lights, so that beam waist positions that are on the third plane and that are of the sub-target signal lights output from the second beam expander are located on the output ports.

With reference to the first aspect and the foregoing implementation manners of the first aspect, in a seventh implementation manner of the first aspect, the first optical path changer and the second optical path changer are at least one lens.

With reference to the first aspect and the foregoing implementation manners of the first aspect, in an eighth implementation manner of the first aspect, the first optical path changer and the second optical path changer share the at least one lens.

With reference to the first aspect and the foregoing implementation manners of the first aspect, in a ninth implementation manner of the first aspect, when the first optical path changer and the second optical path changer share one lens, on the third plane, an incidence point that is on the demultiplexer and that is of the target signal light is located on an axial line that is in the main axis direction and that is of the first optical path changer.

With reference to the first aspect and the foregoing implementation manners of the first aspect, in a tenth implementation manner of the first aspect, when the first optical path changer and the second optical path changer share one lens, on the third plane, an incidence point that is on the demultiplexer and that is of the target signal light is not located on an axial line that is in the main axis direction and that is of the first optical path changer.

With reference to the first aspect and the foregoing implementation manners of the first aspect, in an eleventh implementation manner of the first aspect, when the first optical path changer and the second optical path changer share one lens, on the first plane, an incidence point that is on the demultiplexer and that is of the target signal light is located on an axial line that is in the main axis direction and that is of the first optical path changer.

With reference to the first aspect and the foregoing implementation manners of the first aspect, in a twelfth implementation manner of the first aspect, when the first optical path changer and the second optical path changer share one lens, on the first plane, an incidence point that is on the demultiplexer and that is of the target signal light is not located on an axial line that is in the main axis direction and that is of the first optical path changer.

With reference to the first aspect and the foregoing implementation manners of the first aspect, in a thirteenth implementation manner of the first aspect, the first optical path changer and the second optical path changer are at least one concave mirror.

With reference to the first aspect and the foregoing implementation manners of the first aspect, in a fourteenth implementation manner of the first aspect, the first optical path changer and the second optical path changer share the at least one concave mirror.

With reference to the first aspect and the foregoing implementation manners of the first aspect, in a fifteenth implementation manner of the first aspect, the first optical path changer includes: at least one first cylindrical lens, configured to change propagation directions that are on the third plane and that are of the sub-target signal lights; and the second optical path changer includes: at least one second cylindrical lens, configured to change propagation directions that are on the first plane and that are of the sub-target signal lights; at least one third cylindrical lens, configured to adjust, to the first optical switch array, a beam waist position that is on the first plane and that is of the target signal light output from the first cylindrical lens module; and at least one fourth cylindrical lens, configured to adjust beam waist positions that are on the first plane and that are of sub-target signal lights output from the first optical switch array, to correspond to a beam waist position that is on the first plane, between the output port and the demultiplexer, and of the target signal light that is output from the input port.

According to a second aspect, an optical communications method is provided, where the method is performed in an apparatus that includes an input system, a first optical switch array, and an output system, where the input system includes N input ports that are one-dimensionally arranged on a first plane, and a demultiplexer; the first optical switch array includes N×K first optical switch units that are two-dimensionally arranged on a second plane, where K is a quantity of sub-signal lights that are included in signal light, center wavelengths of the sub-signal lights are different from each other, the second plane is perpendicular to a main axis direction, the main axis direction is a transmission direction of signal light that is output from the input ports, the first plane is perpendicular to the second plane, the first optical switch units can rotate in a first axial line direction and a second axial line direction, the first axial line direction is a direction of an intersecting line between the first plane and the second plane, the second axial line direction is a direction of an intersecting line between a third plane and the second plane, the third plane is perpendicular to the second plane, the third plane is perpendicular to the first plane, one first optical switch unit is configured to receive only one beam of sub-signal light that is from one input port, and input ports or sub-signal lights corresponding to the first optical switch units are different from each other; and the output system includes a second optical switch array, and M output ports that are two-dimensionally arranged, where the second switch array includes M second optical switch units that are two-dimensionally arranged, one second optical switch unit is configured to receive, within a same period of time, only one piece of sub-signal light that is from a same input port, the second optical switch units can rotate at least in the second axial line direction, and the second optical switch units correspond one-to-one to the output ports, where the method includes: receiving target signal light by using a target input port, where a flare of the target signal light is a circle, and the target signal light includes at least two beams of sub-target signal lights; performing first beam expansion processing on the target signal light, so as to change the flare that is on the second plane and that is of the target signal light from the circle to an ellipse, where a major axis direction of the ellipse is the second axial line direction, a minor axis direction of the ellipse is the first axial line direction, and a major axis length of the ellipse is determined based on the following parameters: bandwidth of the target signal light, a spacing between adjacent sub-target signal lights, of the at least two beams of sub-target signal lights, center wavelengths of the at least two beams of sub-target signal lights, and diffraction parameters of the demultiplexer; performing demultiplexing processing on the target signal light by using the demultiplexer, to obtain the at least two beams of sub-target signal lights by splitting the target signal light, so that the sub-target signal lights disperse on the third plane; performing first optical path change processing on the sub-target signal lights, so that the sub-target signal lights are incident, parallel to each other, into the corresponding first optical switch units; based on output ports corresponding to the sub-target signal lights, controlling rotation of the first optical switch units that correspond to the sub-target signal lights and that are in the first optical switch array, so as to transmit the sub-target signal lights to corresponding second optical switch units; performing second optical path change processing on the sub-target signal lights, so that a projection that is on the third plane and that is of the sub-target signal light on which the second optical path change processing has been performed is parallel to a projection that is on the third plane and that is of the corresponding sub-target signal light before the first optical path change processing; performing second beam expansion processing on the sub-target signal lights, so as to change flares that are in the direction of the second plane and that are of the sub-target signal lights from ellipses to circles, where diameters of the circles are determined based on a transmission requirement of the output ports; and controlling rotation of the second optical switch units that correspond to the sub-target signal lights and that are in the second optical switch array, so as to transmit the sub-target signal lights to corresponding output ports.

With reference to the second aspect, in a first implementation manner of the second aspect, the method further includes: when for one output port, there are at least two beams of sub-target signal lights that need to be received, combining the at least two beams of sub-target signal lights that need to be received into one beam of signal light, and transmitting the one beam of signal light to the second optical switch array; or when for one output port, there is only one beam of sub-target signal lights that needs to be received, adjusting optical power distribution within a bandwidth range of the sub-target signal lights.

With reference to the second aspect and the foregoing implementation manner of the second aspect, in a second implementation manner of the second aspect, the performing first beam expansion processing on the target signal light includes: performing first beam expansion processing on the target signal light, so that a beam waist position that is on the third plane and that is of the target signal light before the first optical path change processing is located on the demultiplexer.

With reference to the second aspect and the foregoing implementation manners of the second aspect, in a third implementation manner of the second aspect, the performing second beam expansion processing on the sub-target signal lights includes: performing second beam expansion processing on the sub-target signal lights, so that beam waist positions that are on the third plane and that are of the sub-target signal lights on which the second beam expansion processing has been performed are located on the output ports.

By means of the optical communications apparatus and method in the embodiments of the present invention, a first beam expander is set, and beam expansion processing is performed on signal light by using the first beam expander, so that a flare that is of the signal light incident into a second optical switch array and that is on a configuration plane of the second optical switch array can be changed from a circle to an ellipse, where a major axis length of the elliptical flare that is generated after the beam expansion processing can satisfy a demultiplexing processing requirement, and because a minor axis length of the ellipse is less than the major axis length of the ellipse, more second optical switch units can be configured, in a minor axis direction of the ellipse, for the second optical switch array, and then more output ports can be provided; in addition, first optical switch units two-dimensionally rotate, and one second optical switch unit is configured to receive, within a same period of time, only one piece of sub-signal light that is from a same input port, so that M second optical switch units do not need to be one-dimensionally arranged, and then two-dimensional arrangement of M output ports can be implemented. Therefore, a network cross connect capability for an output end can be improved within given limited configuration space, and network needs and user requirements can be satisfied.

BRIEF DESCRIPTION OF DRAWINGS

To describe the technical solutions in the embodiments of the present invention more clearly, the following briefly describes the accompanying drawings required for describing the embodiments. The accompanying drawings in the following description show merely some embodiments of the present invention, and a person of ordinary skill in the art may still derive other drawings from these accompanying drawings without creative efforts.

FIG. 10 is a schematic flowchart of an optical communications method according to an embodiment of the present invention.

DESCRIPTION OF EMBODIMENTS

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art based on the embodiments of the present invention without creative efforts shall fall within the protection scope of the present invention.

The technical solutions of the embodiments of the present invention may be applied to various communications systems that can transmit data by using signal light, for example, a Global System for Mobile communications (GSM), a Code Division Multiple Access (CDMA) system, a Wideband Code Division Multiple Access (WCDMA), a General Packet Radio Service (GPRS), and a Long Term Evolution (LTE).

Figure 1:
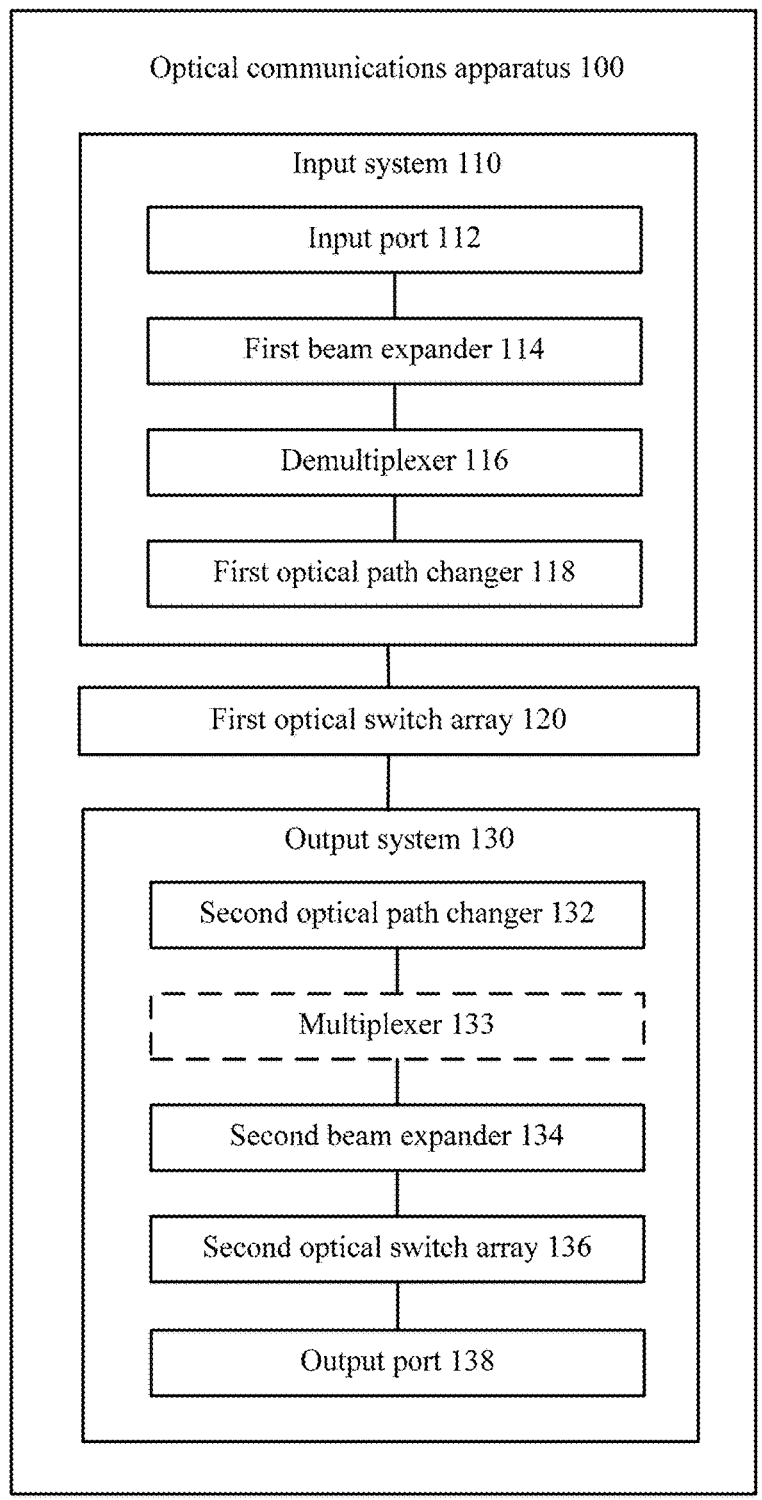
FIG. 1 is a schematic block diagram of a structure of an optical communications apparatus according to an embodiment of the present invention.

FIG. 1 shows a schematic structure of an optical communications apparatus 100 according to an embodiment of the present invention. As shown in FIG. 1, the apparatus 100 includes:

an input system 110, a first optical switch array 120, and an output system 130, where the input system 110 includes:

N input ports 112 that are arranged on a first plane, a first beam expander 114, a demultiplexer 116, and a first optical path changer 118, the first optical switch array 120 includes N×K first optical switch units that are two-dimensionally arranged on a second plane, where K is a quantity of sub-signal lights that are included in signal light, wavelengths of the sub-signal lights are different from each other, the second plane is perpendicular to a main axis direction, the main axis direction is a transmission direction of signal light that is output from the input ports, the first plane is perpendicular to the second plane, the first optical switch units can rotate in a first axial line direction and a second axial line direction, the first axial line direction is a direction of an intersecting line between the first plane and the second plane, the second axial line direction is a direction of an intersecting line between a third plane and the second plane, the third plane is perpendicular to the second plane, the third plane is perpendicular to the first plane, one first optical switch unit is configured to receive only one beam of sub-signal light that is from one input port, and input ports or sub-signal lights corresponding to the first optical switch units are different from each other; and the output system 130 includes a second optical path changer 132, a second beam expander 134, a second optical switch array 136, and M output ports 138 that are two-dimensionally arranged, where the second switch array 136 includes M second optical switch units that are two-dimensionally arranged, and the second optical switch units correspond one-to-one to the output ports, where a target input port of the N input ports 112 is configured to: when receiving target signal light, transmit the target signal light to the first beam expander, where a flare of the target signal light that is output by the target input port is a circle, and the target signal light includes at least two beams of sub-target signal lights;

the first beam expander 114 is configured to perform first beam expansion processing on the target signal light, so as to change the flare that is in a direction of the second plane and that is of the target signal light from the circle to an ellipse, and transmit the target signal light on which the first beam expansion processing has been performed to the demultiplexer 116, where a major axis direction of the ellipse is the second axial line direction, a minor axis direction of the ellipse is the first axial line direction, and a major axis length of the ellipse is determined based on the following parameters:

bandwidth of the target signal light, a spacing between adjacent sub-target signal lightss of the at least two beams of sub-target signal lights, center wavelengths of the at least two beams of sub-target signal lights, and diffraction parameters of the demultiplexer 116;

the demultiplexer 116 is configured to perform demultiplexing processing on the target signal light, to obtain the at least two beams of sub-target signal lights by splitting the target signal light, so that the sub-target signal lights disperse on the third plane, and transmit the sub-target signal lights to corresponding first optical switch units by using the first optical path changer 118;

the first optical path changer 118 is configured to perform first optical path change processing on the sub-target signal lights, so that the sub-target signal lights are incident, parallel to each other, into the corresponding first optical switch units;

the first optical switch array 120 is configured to: based on output ports corresponding to the sub-target signal lights, control rotation of the first optical switch units corresponding to the sub-target signal lights, so as to transmit the sub-target signal lights to corresponding second optical switch units by using the second optical path changer 132 and the second beam expander 134;

the second optical path changer 132 is configured to perform second optical path change processing on the sub-target signal lights, where a projection that is on the third plane and that is of the sub-target signal light on which the second optical path change processing has been performed is parallel to a projection that is on the third plane and that is of the corresponding sub-target signal light before the first optical path change processing;

the second beam expander 134 is configured to perform second beam expansion processing on the sub-target signal lights, so as to change flares that are in the direction of the second plane and that are of the sub-target signal lights from ellipses to circles, where diameters of the circles are determined based on a transmission requirement of the output ports 138; and the second optical switch array 136 is configured to control rotation of the second optical switch units corresponding to the sub-target signal lights, so as to transmit the sub-target signal lights to corresponding output ports 138.

At first, functions and structures of components in the optical communications apparatus 100 are described.

A. Input system 110

A1. Input port 112

In this embodiment of the present invention, the N input ports 112 that are one-dimensionally arranged are configured to acquire signal light of N dimensions, where the signal light may come from a foreign communications node (for example, a previous-hop communications node on a communications link), or may come from a local node, that is, implement a local adding function, which is not specially limited in the present invention.

Herein, the so-called "adding" refers to acquiring (by using an input port) uplink signal light that is from a local node, and sending the uplink signal light, and the uplink signal light may be signal light sent to a foreign communications node, or may be signal light sent to a local communications node, which is not specially limited in the present invention. It should be noted that, in this embodiment of the present invention, the input port used by the uplink signal light may be randomly set. For example, a quantity of input ports used by uplink signal light may be the same as a quantity of wavelengths of the uplink signal light, that is, one input port is configured to acquire uplink signal light of only one wavelength; or a time division multiplexing manner may be used, so that one input port is configured to send, within one period of time, uplink signal light of one wavelength, and send, within another period of time, uplink signal light of another wavelength.

In addition, a dimension of signal light may refer to a quantity, under a preset rule, of categories of sources of the signal light (or, a quantity of optical fibers connected to the ROADM), where the preset rule may be to perform division according to areas, for example, to perform division at a city level, a province level, or a country level; or may be to perform division according to entities, for example, one communications node is one dimension, or one group of communications nodes is one dimension.

It should be understood that, the dimension division manners listed above are described only as examples; the present invention is not specially limited thereto; all other division methods in which communications nodes can be distinguished fall within the protection scope of the present invention.

In this embodiment of the present invention, the N input ports 112 may include an input optical fiber array and an input collimator array.

The input optical fiber array may include N input optical fibers that are one-dimensionally arranged, where one input optical fiber is configured to acquire signal light of one dimension.

The input collimator array may include N collimators that are one-dimensionally arranged, where the N collimators correspond one-to-one to the N input optical fibers, and one collimator is configured to collimate signal light that is output from a corresponding input optical fiber.

It should be noted that, the foregoing "N input ports that are one-dimensionally arranged" refer to that the N input ports are arranged on a same plane, such as a first plane (a YOZ plane in FIG. 2 to FIG. 8), where the first plane is perpendicular to a dispersion plane of sub-signal light that is generated when the demultiplexer described below performs demultiplexing processing on signal light, that is, a third plane (an XOZ plane in FIG. 2 to FIG. 8), and the first plane is perpendicular to an arrangement plane of the N×K first optical switch units described below, that is, a second plane (an XOY plane in FIG. 2 to FIG. 8). That is, if a transmission direction of signal light that is output from an input port is used as the main axis direction, the second plane is perpendicular to the main axis direction, and the first plane and the third plane are parallel to the main axis direction. Similarly, the "N input optical fibers that are one-dimensionally arranged" refer to that the N input optical fibers are arranged on the first plane; the "N collimators that are one-dimensionally arranged" refer to that the N collimators are arranged on the first plane. In the following, to avoid repeated descriptions, descriptions about a same or similar case are omitted.

After the foregoing processing, flares that are projected in the direction of the foregoing second plane (the XOY plane in FIG. 2 to FIG. 8) and that are of the signal light output from the foregoing N input ports 112 (which are specifically the foregoing collimators) are circles. For the convenience of understanding and following description, without loss of generality, diameters of the circles are set to d herein.

In this embodiment of the present invention, the signal light that is input from the input ports 112 is wavelength division multiplexing (WDM) signal light, and one beam of WDM signal light includes multiple beams of (at least two beams of) sub-signal lights, where center wavelengths of the sub-signal lights (or, center frequencies of the sub-signal lights) are different from each other, and the sub-signal lights also have particular bandwidth.

The foregoing input ports may simultaneously receive signal light, and output the signal light. In the following, for the convenience of understanding and description, without loss of generality, descriptions are provided by using an example of processing performed by the optical communications apparatus 100 on signal light (referred to as target signal light below) received by the target output port of the N input ports, and the sub-signal light included in the target signal light is referred to as sub-target signal lights.

A2. First beam expander 114

The first beam expander 114 is configured, in a transmission direction of the target signal light, after an input collimator array, and the first beam expander 114 plays, only on the third plane (the XOZ plane in FIG. 2 to FIG. 9), a role of beam expansion on the target signal light, so as to adjust a flare that is on the second plane (the XOY plane in FIG. 2 to FIG. 8) and that is of the target signal light from a circle to an ellipse. Specifically, flares that are in the direction of the XOZ plane, the direction of the XOY plane, and the direction of the YOZ plane and that are of target signal light output from a collimator array are all circles. In the direction of the XOZ plane, the first beam expander 114 stretches, in a direction (an OX axis direction in FIG. 2 to FIG. 8) perpendicular to a propagation direction (an OZ axis direction in FIG. 2 to FIG. 8) of the target signal light, the flares, so that in the directions of the XOZ and XOY planes, the flares of the target signal light change from circles to ellipses.

It should be noted that, in this embodiment of the present invention, in the direction of the XOY plane, compared with the diameter d of the original circular flare, a length that is in a minor axis direction and that is of the elliptical flare may increase, or may remain unchanged, which is not specially limited in the present invention.

In this embodiment of the present invention, to enable an output light signal to satisfy a need (which, for example, may be set according to a user need and a hardware status of a transmission network) of a preset bandwidth feature (such as a bandwidth spectral line), a major axis length of the elliptical flare, or, a length that is in the direction (the OX axis direction in FIG. 2 to FIG. 8) perpendicular to the propagation direction (the OZ axis direction in FIG. 2 to FIG. 8) of the target signal light and that is on a wavelength exchange plane (that is, the XOZ plane in FIG. 2 to FIG. 8) needs to satisfy a preset condition, where the preset condition may be determined according to a diffraction capability of the demultiplexer 116 and a property of the target signal light.

Optionally, in this embodiment of the present invention, the demultiplexer is a grating, and the diffraction parameters of the demultiplexer include a grating constant of the demultiplexer and an emergence angle of the demultiplexer.

Specifically, as an example but not a limitation, the foregoing major axis length a may be determined by using the following formula 1:

$$a = \frac{\zeta \lambda d \cos\theta}{2\pi \Delta \lambda} \qquad \text{formula 1}$$

where parameters $\zeta$, $\lambda$, and $\Delta\lambda$ correspond to the property of the target signal light, $\zeta$ is determined according to bandwidth (or, a bandwidth requirement) of the foregoing target signal light, and herein, for example, when the bandwidth spectral line needs to be in third-order Gaussian distribution, $\zeta$ may be set to 5. $\lambda$ indicates the center wavelengths of the sub-target signal lights included in the target signal light, and $\Delta\lambda$ indicates a spacing between two pieces of adjacent sub-target signal lightss.

In addition, parameters d and $\theta$ correspond to the diffraction capability of the demultiplexer 116, where d indicates a grating constant (an example of a diffraction parameter) of the demultiplexer described below, and $\theta$ is an emergence angle (another example of a diffraction parameter) of the demultiplexer 116 described below.

In addition, as an example but not a limitation, the anamorphic prism pair, the cylindrical lens pair, or the like may be selected and used as the first beam expander 114.

Optionally, the first beam expander is further configured to perform first beam expansion processing on the target signal light, so that a beam waist position that is of the target signal light, on the third plane, and between the first beam expander and the first optical path changer is located on the demultiplexer.

Figure 3A:
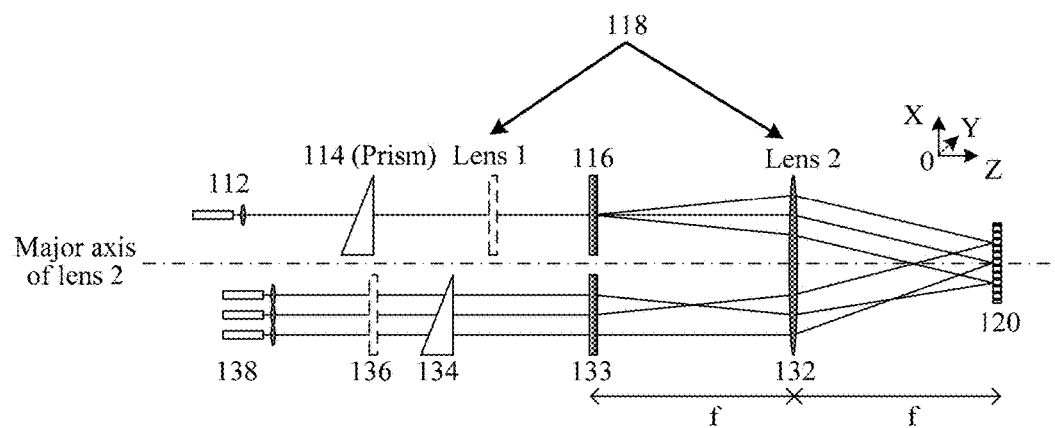
FIG. 3A is a schematic top view of configuration of an optical communications apparatus according to another embodiment of the present invention.

Specifically, in this embodiment of the present invention, viewing (for example, as shown in FIG. 3A) in a direction perpendicular to the third plane, the first beam expander 114 may further adjust a beam waist position that is on the third plane and that is of a target light signal, so that a beam waist position that is between the first beam expander 114 and the first optical path changer 118 and that is of the target light signal is located on the demultiplexer 116 described below, so that beam waist positions of sub-signal light processed by the first optical path changer 118 are located on a first optical switch unit array.

A flare located at a beam waist position has a minimum size, and therefore can reduce a need for a size of an optical switch unit in the first optical switch unit array, and ensure an output feature and a bandwidth feature that are of a component.

A3. Demultiplexer 116

The demultiplexer 116 may split, in a diffraction manner and on the third plane (the XOZ plane in FIG. 2 to FIG. 8), the target signal light into sub-target signal lights whose wavelengths (or, center frequencies) are different from each other, so that the sub-target signal lights that are output from the demultiplexer 116 disperse in the direction of the third plane and in a radial manner.

Optionally, the demultiplexer is at least one grating.

As an example but not a limitation, the demultiplexer may be a reflection grating, a transmission grating, a dispersion prism, or a plane waveguide grating. In addition, to enhance a dispersion effect, a combination of multiple gratings may be used, or a light path may be adjusted, so that the target signal light passes through a same grating for multiple times.

A3. First Optical Path Changer 118

The first optical path changer 118 may perform first optical path change processing on sub-target signal lights that are input, so that the sub-target signal lights are incident, parallel to each other, into corresponding first optical switch units in the first optical switch unit array 120 described below.

As an example but not a limitation, the first optical path changer 118 may include a lens, a concave mirror, or a cylindrical lens. In addition, according to a difference of a component that is selected as the first optical path changer 118, configuration positions of components in the optical communications apparatus 100 are different from each other, or, transmission paths that are in the optical communications apparatus 100 and that are of signal light are different from each other. Subsequently, configuration position manners that may be selected and transmission paths for the manners are described in detail.

In addition, in this embodiment of the present invention, to reduce a difference, one or more glued lenses, optimum-shape lenses, or the like may be used as the first optical path changer 118.

Therefore, after processing by the foregoing first beam expander 114, the demultiplexer 116, and the first optical path changer 118, in a case in which N beams of signal light are output from the foregoing N input ports 112, and each piece of signal light includes K beams of sub-signal lights whose wavelengths are different from each other, the N beams of signal light are split, in space, into N×K beams of sub-signal lights that are parallel to each other, where flares that are in the direction of the foregoing second plane and that are of the N×K pieces of sub-signal lights are two-dimensionally arranged, that is, N rows of flares are arranged in the direction (an OY axis in FIG. 2 to FIG. 8) of the intersecting line between the first plane and the second plane, and K columns of flares are arranged in the direction (an OX axis in FIG. 2 to FIG. 8) of the intersecting line between the third plane and the second plane, where sub-signal lights corresponding to a same row of flares are obtained by splitting signal light of a same input port, and wavelengths (or, center frequencies) of sub-signal lights corresponding to a same column of flares are the same. In other words, wavelengths of sub-signal lights corresponding to a same row of flares are different from each other, and input ports of sub-signal lights corresponding to a same column of flares are different from each other.

B. First Optical Switch Array 120

In this embodiment of the present invention, the first optical switch array 120 includes N×K first optical switch units, that is, the N×K first optical switch units are two-dimensionally arranged in N rows and K columns in the direction of the foregoing second plane (the XOY plane in FIG. 2 to FIG. 8). Specifically, N rows of first optical switch units are arranged in the direction (the OY axis in FIG. 2 to FIG. 8) of the intersecting line between the first plane and the second plane, and K columns of first optical switch units are arranged in the direction (the OX axis in FIG. 2 to FIG. 8) of the intersecting line between the third plane and the second plane. First optical switch units that are located in a same row correspond to a same input port, and wavelengths corresponding to first optical switch units that are located in a same column are the same. In other words, wavelengths corresponding to first optical switch units that are located in a same row are different from each other, and input ports corresponding to first optical switch units that are located in a same column are different from each other.

Therefore, the N×K first optical switch units correspond one-to-one to the foregoing N×K pieces of sub-signal lights, that is, one first optical switch unit is configured to transmit only one beam of sub-signal light to the output port described below (or, the second optical switch unit described below) corresponding to the sub-signal light.

In addition, in this embodiment of the present invention, the first optical switch units can two-dimensionally rotate. Specifically, the first optical switch units can rotate in the direction (the OY axis in FIG. 2 to FIG. 8) of the intersecting line between the first plane and the second plane, and the first optical switch units can rotate in the direction (the OX axis in FIG. 2 to FIG. 8) of the intersecting line between the third plane and the second plane. Therefore, the first optical switch units can transmit corresponding sub-signal light to any second optical switch unit in the second optical switch array described below.

As an example but not a limitation, a first optical switch unit in this embodiment of the present invention may be implemented by using any one of the following technologies.

For example, in this embodiment of the present invention, a first optical switch unit may be implemented by using a micro-electro-mechanical system (MEMS, Micro-Electro-Mechanical System) technology, where in the MEMS technology, a micro-electro-mechanical apparatus and a control circuit whose geometrical sizes or operational sizes are in an order of magnitude of only micron, submicron, or even nanometer are highly integrated into very small space on a silicon-based or non-silicon-based material, to form an electromechanical integrated device or system. By using an electrostatic force or another control force, the first optical switch unit implemented by using the MEMS technology makes a micro-reflector mechanically move, so that a light beam incident onto the micro-reflector deflects to any direction. In a case in which the first optical switch unit in an embodiment of the present invention is implemented by using the MEMS technology, a controller may control a micromechanical structure by using a control instruction, so as to drive a light modulator (a microlens) to rotate, thereby implementing deflection of a light path, and then implementing switching of a dimension (or, a transmission path) of signal light.

For another example, in this embodiment of the present invention, a first optical switch unit may be implemented by using a liquid crystal on silicon (LCoS) technology, where in the LCoS technology, a liquid crystal grating principle is used to adjust light reflection angles of different wavelengths, to achieve an objective of separating light. Because there is no movable part, reliability of the LCoS technology is considerable. In the LCoS technology, change of a refractive index of a liquid crystal unit is controlled, to implement change of a reflection angle, which can conveniently implement extension and upgrade. Different channels correspond to different areas of a spatial light modulator (liquid crystal) array, and a phase of a flare is adjusted to change a transmission direction of light, achieving an objective of switching different ports and adjusting attenuation.

For another example, in this embodiment of the present invention, a first optical switch unit may be implemented by using a liquid crystal (LC) technology. In the first optical switch unit that is implemented by using the LC technology, after passing through a birefringent crystal, incident signal light is divided into two polarization states, where after one path of light passes through a half-wave plate, two paths of light have a same polarization state, and then are incident onto the first optical switch unit (a liquid crystal module), and a voltage of the birefringent crystal is adjusted to change an arrangement structure of the liquid crystal (change angles of molecules inside the crystal), so that a refractive index of the crystal is changed, and a light source is output in a form of light at different angles. After light passes through each layer of liquid crystal, two directions may be selected, and after light passes through multiple liquid crystal layers, multiple light paths may be selected.

For another example, in this embodiment of the present invention, a first optical switch unit may be implemented by using a digital light processing (DLP) technology. An internal structure of the first optical switch unit implemented by using the DLP technology is similar to an internal structure of the light modulator implemented by using the MEMS technology, and switching of photon energy is implemented by means of deflection of a microlens. A difference is that, a DLP micromirror has only several rotation angles, which limits a quantity of output ports.

C. Output System 130

C1. Second Optical Path Changer 132

The second optical path changer 132 may perform second optical path change processing on the sub-target signal lights that are input, so as to transmit the sub-target signal lights to corresponding second optical switch units, where a projection that is on the third plane (the XOZ plane in FIG. 2 to FIG. 8) and that is of the sub-target signal lights on which the second optical path change processing has been performed is parallel to a projection that is on the third plane (the XOZ plane in FIG. 2 to FIG. 8) and that is of the corresponding sub-target signal light before the first optical path change processing, so that all sub-target signal lights that are emergent from the second optical path changer 132 can return, at angles at which the sub-target signal lights are emergent from the demultiplexer 116, to the second optical switch array 136 described below (or, the multiplexer 135 described below), and then it can be ensured that sub-signal lights (whose wavelengths are different from each other) that are incident to the second optical switch array 136 (or, the multiplexer 135 described below) and that come from a same input port 112 can be combined into one beam of WDM signal light.

As an example but not a limitation, the second optical path changer 132 may include a lens or a concave mirror. In addition, according to a difference of a component that is selected as the second optical path changer 132, configuration positions of components in the optical communications apparatus 100 are different from each other, or, transmission paths that are in the optical communications apparatus 100 and that are of signal light are different from each other. In addition, in this embodiment of the present invention, the second optical path changer 132 and the first optical path changer 118 may share one or more lenses, or the like. Subsequently, configuration position manners that may be selected and transmission paths for the manners are described in detail.

C2. Multiplexer 133

Optionally, the output system further includes:

a multiplexer 133, located between the second optical path changer 132 and the second beam expander 134, and configured to: when for one output port 138, there are at least two beams of sub-target signal lights that need to be received, combine the at least two beams of sub-target signal lights that need to be received into one beam of signal light, and transmit the one beam of signal light to the second optical switch array by using the second beam expander; or configured to: when for one output port 138, there is only one beam of sub-target signal lights that needs to be received, adjust optical power distribution of the sub-target signal lights.

Specifically, in this embodiment of the present invention, a case (that is, case 1) in which at least two beams of sub-target signal lights that are from a same output port 112 need to be sent to a same output port of the M output ports 138 described below may exist, and a case (that is, case 2) in which at least two beams of sub-target signal lights that are from a same output port 112 need to be sent to different output ports of the M output ports 138 described below may also exist. In the following, functions of the multiplexer 133 in the foregoing two cases are separately described.

Case 1

Figure 3B:
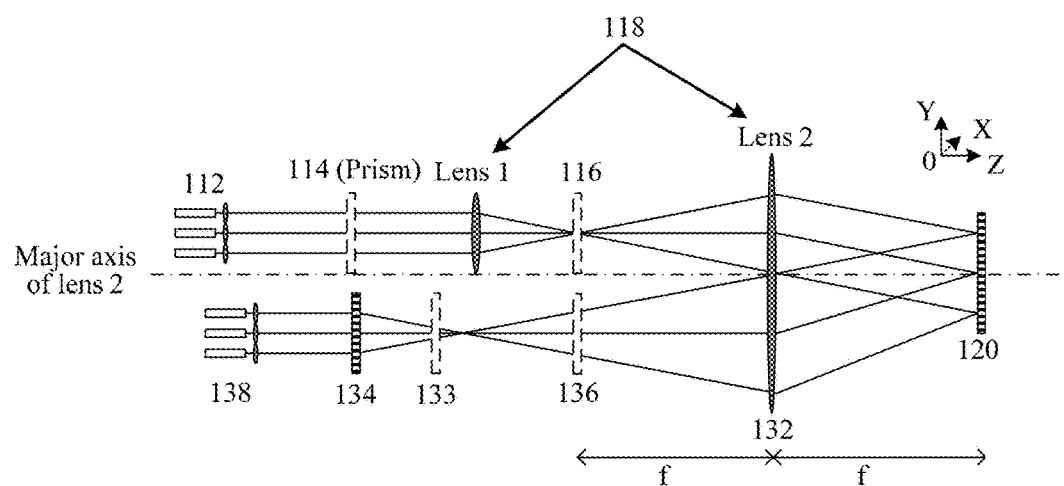
FIG. 3B is a schematic side view of the configuration of the optical communications apparatus shown in FIG. 3A.

Viewing (for example, as shown in FIG. 3A) in a direction perpendicular to the third plane, when at least two beams of sub-target signal lights that are from a same input port are input into a same position of the multiplexer 133, viewing (for example, as shown in FIG. 3B) in a direction perpendicular to the first plane, the at least two beams of sub-target signal lights that are from the same input port are located, in a transmission direction, on a same plane (which, in this case, is presented as a line between the second optical path changer 132 and the multiplexer 133 in FIG. 3B), and therefore the multiplexer 133 can combine the at least two beams of sub-target signal lights into one beam of signal light. Similarly, the sub-target signal lights that are from different input ports are located, in a transmission direction, on different planes (which, in this case, is presented as multiple lines between the second optical path changer 132 and the multiplexer 133 in FIG. 3B), and therefore the multiplexer 133 does not combine the at least two beams of sub-target signal lights into one beam of signal light.

Case 2

Viewing (for example, as shown in FIG. 3A) in a direction perpendicular to the third plane, when at least two beams of sub-target signal lights that are from a same input port are input into different positions of the multiplexer 133, the multiplexer 133 does not need to combine the two beams of sub-target signal lights, and in this case, the multiplexer 133 may adjust optical power distribution within a bandwidth range of the sub-target signal lights.

Similar to multiple sub-target signals, the sub-target signals include a series of wavelengths that are within frequency bands on two sides of the center wavelength, and multiplexing is performed on these wavelengths by using the multiplexer, so that a maximum power value of each wavelength is located at a center position of an output port, thereby improving a bandwidth feature of the target output port, and therefore a bandwidth feature of output signal light satisfies a need of a bandwidth feature of a signal in the communications field.

In addition, in this embodiment of the present invention, configuration of the multiplexer 133 may be optional. For example, in a case in which one output port 138 does not need to output multiple pieces of sub-target signal lights, and a requirement on a feature of a bandwidth spectral line is not strict, the multiplexer 133 may not be configured, and the second switch array 136 is directly used.

In addition, in this embodiment of the present invention, viewing (for example, as shown in FIG. 3A) in the direction perpendicular to the third plane, signal light that is output from the multiplexer 133 are parallel to each other.

Optionally, the multiplexer is at least one grating.

As an example but not a limitation, the multiplexer may be a reflection grating, a transmission grating, or a dispersion prism.

Optionally, the multiplexer and the demultiplexer share the at least one grating.

As an example but not a limitation, in this embodiment of the present invention, the multiplexer 133 and the demultiplexer 116 may share one or more gratings, or the like.

Subsequently, configuration position manners that may be selected and transmission paths for the manners are described in detail.

C3. Second Beam Expander 134

The second beam expander 134 is configured to adjust flares that are on the second plane (the XOY plane in FIG. 2 to FIG. 8) and that are of sub-target signal lights from ellipses to circles. Diameters of the circular flares may be determined according to specifications of an output port, for example, specifications of the output optical fiber described below, so that sub-target signal lights that are output from the second beam expander 134 satisfy a transmission requirement of the output port described below.

In addition, as an example but not a limitation, the anamorphic prism pair, the cylindrical lens pair, or the like may be selected and used as the second beam expander 134.

Optionally, the second beam expander is further configured to perform second beam expansion processing on the sub-target signal lights, so that beam waist positions that are on the third plane and that are of the sub-target signal lights output from the second beam expander are located on the output ports.

Specifically, in this embodiment of the present invention, viewing (for example, as shown in FIG. 3A) in the direction perpendicular to the third plane, the second beam expander 134 may further adjust a beam waist position that is on the third plane and that is of a target light signal, so that the beam waist position of the target light signal is located on the output port 138 described below.

C4. Second Optical Switch Array 136

In this embodiment of the present invention, the second optical switch array 136 includes M=P×Q second optical switch units, that is, P×Q second optical switch units are two-dimensionally arranged in P rows and Q columns.

In addition, the P×Q second optical switch units correspond one-to-one to the M=P×Q output ports 138 described below, that is, one second optical switch unit is configured to transmit only signal light that needs to be transmitted to a same output port.

In addition, in this embodiment of the present invention, the second optical switch unit can at least rotate in the direction (the OX axis in FIG. 2 to FIG. 8) of the intersecting line between the third plane and the second plane.

Specifically, in a case in which the foregoing multiplexer 133 is configured, viewing (for example, as shown in FIG. 3A) in the direction perpendicular to the third plane, signal light that is output from the multiplexer 133 are parallel to each other; therefore signal light transmitted to second optical switch units is parallel to each other, and the second optical switch units can transmit signal light, parallel to each other, to the output port 138 described below without needing to rotate in the direction (the OY axis in FIG. 2 to FIG. 8) of the intersecting line between the first plane and the second plane.

Similarly, in a case in which the foregoing multiplexer 133 is not configured, viewing (for example, as shown in FIG. 3A) in the direction perpendicular to the third plane, signals that are transmitted to the second optical switch units are not parallel to each other; therefore the second optical switch units need to be capable of rotating in the direction (the OY axis in FIG. 2 to FIG. 8) of the intersecting line between the first plane and the second plane, so as to transmit signal light, parallel to each other, to the output port 138 described below.

In addition, viewing (for example, as shown in FIG. 3B) in the direction perpendicular to the first plane, the signal light transmitted to the second optical switch units is not parallel to each other; therefore, the second optical switch units need to be capable of rotating in the direction (the OX axis in FIG. 2 to FIG. 8) of the intersecting line between the third plane and the second plane, so as to transmit the signal light, parallel to each other, to the output port 138 described below.

As an example but not a limitation, a method for implementing the second optical switch unit in this embodiment of the present invention may be similar to that for the first optical switch unit. Herein, to avoid repeated descriptions, detailed descriptions about the method are omitted.

It should be noted that, in this embodiment of the present invention, P and Q that are described above may be randomly set according to a need (for example, provided configuration space, a quantity of foreign communications nodes, or the like), and are not limited by a quantity of sub-signal lights that are included in signal light.

C5. Output Port 138

In this embodiment of the present invention, M=P×Q output ports 138 are two-dimensionally arranged in P rows and Q columns, and therefore the M=P×Q output ports 138 correspond one-to-one to the foregoing P×Q second optical switch units.

In addition, the M output ports 138 are configured to send signal light of M dimensions, where the signal light may need to be sent to a foreign communications node (for example, a next-hop communications node on a communications link), or may need to be sent to a local node, that is, implement a local dropping function, which is not specially limited in the present invention.

Herein, the so-called "dropping" refers to acquiring (by using an output port) downlink signal light that needs to be sent to a local node, where the downlink signal light may be signal light that is from a foreign communications node, or may be signal light that is from a local communications node, which is not specially limited in the present invention. It should be noted that, in this embodiment of the present invention, an output port used by downlink signal light may be randomly set. For example, a quantity of input ports used by downlink signal light may be the same as a quantity of wavelengths of the downlink signal light. That is, one output port is configured to acquire downlink signal light of only one wavelength; or a combination of multiple pieces of sub-signal light that are from a same port may be output by using a same output port; or a time division multiplexing manner may be used, so that one output port is configured in one period of time to receive downlink signal light of one wavelength, and configured in another period of time to receive downlink signal light of another wavelength.

In addition, a dimension of signal light may refer to a quantity, under a preset rule, of categories of sources of the signal light (or, a quantity of optical fibers connected to the ROADM), where the preset rule may be to perform division according to areas, for example, to perform division at a city level, a province level, or a country level; or may be to perform division according to entities, for example, one communications node is one dimension, or one group of communications nodes is one dimension.

It should be understood that, the dimension division manners listed above are described only as examples; the present invention is not specially limited thereto; all other division methods in which communications nodes can be distinguished fall within the protection scope of the present invention.

In this embodiment of the present invention, the M output ports 138 may include an output optical fiber array and an output collimator array.

The output optical fiber array may include M output optical fibers that are two-dimensionally arranged, where one output optical fiber is configured to send signal light of one dimension.

The output collimator array may include M collimators that are two-dimensionally arranged, where the M collimators correspond one-to-one to the M output optical fibers, and one collimator is configured to collimate signal light that is output from a corresponding output optical fiber.

In this embodiment of the present invention, signal light that is output from output ports 138 may be WDM signal light, or may be signal light of a single wavelength, which is not specially limited in the present invention.

In the following, configuration, or light path design, of components in the optical communications apparatus 100 in this embodiment of the present invention is exemplarily described.

Configuration Manner 1

Figure 2A:
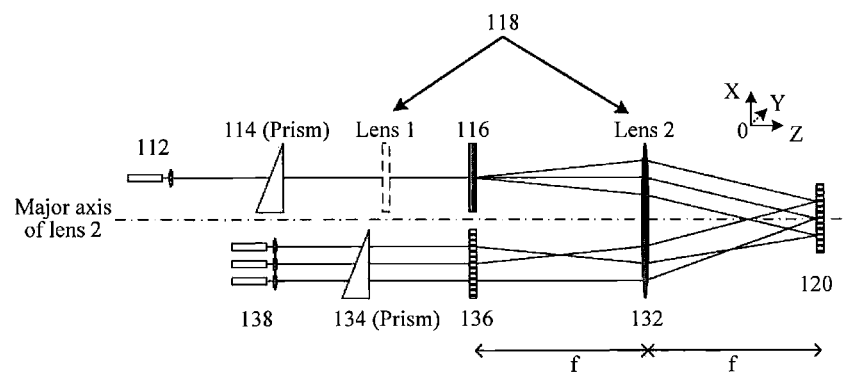
FIG. 2A is a schematic top view of configuration of an optical communications apparatus according to an embodiment of the present invention.
Figure 2B:
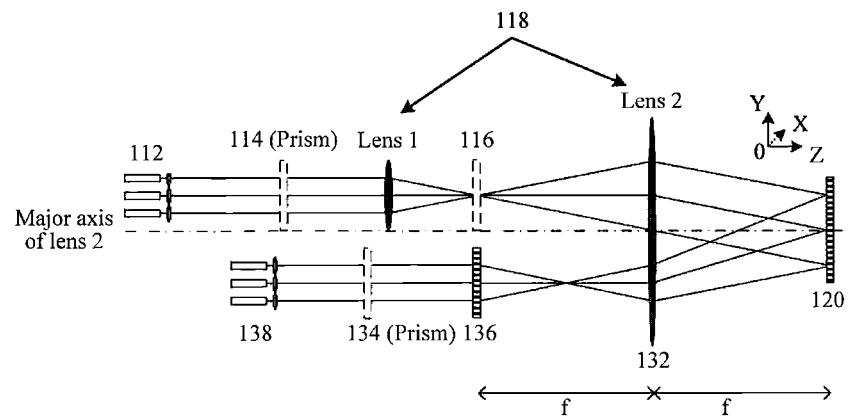
FIG. 2B is a schematic side view of configuration of the optical communications apparatus shown in FIG. 2A.

FIG. 2A shows a schematic top view of an example of configuration of an optical communications apparatus 100 according to an embodiment of the present invention. FIG. 2B is a schematic side view of the configuration of the optical communications apparatus shown in FIG. 2A.

Optionally, the first optical path changer and the second optical path changer are at least one lens.

Optionally, the first optical path changer and the second optical path changer share the at least one lens.

Optionally, when the first optical path changer and the second optical path changer share one lens, on the third plane, an incidence point that is on the demultiplexer and that is of the target signal light is not located on an axial line that is in the main axis direction and that is of the first optical path changer.

Optionally, when the first optical path changer and the second optical path changer share one lens, on the first plane, an incidence point that is on the demultiplexer and that is of the target signal light is not located on an axial line that is in the main axis direction and that is of the first optical path changer.

Specifically, in the configuration manner shown in FIG. 2A and FIG. 2B, the foregoing multiplexer 133 is not configured, and the second optical switch array 136 can two-dimensionally rotate, to implement the foregoing multiplexing function of the multiplexer 133.

As shown in FIG. 2A, the first optical path changer 118 and the second optical path changer 132 share a same lens 2, where the demultiplexer 116, the foregoing lens 2, the first optical switch array 120, and the second optical switch array 136 form a 4*f* system, that is, a distance that is in signal light transmission direction and that is from the demultiplexer 116 to the lens 2, a distance that is in the signal light transmission direction and that is from the first optical switch array 120 to the lens 2, and a distance that is in the signal light transmission direction and that is from the second optical switch array 136 to the lens 2 are all a focal length f of the lens 2, so that it can be ensured that, when a first optical switch unit deflects sub-signal light to any second optical switch unit in the second optical switch array 136, all incidence angles that are on the second optical switch unit and that are of the sub-signal light are the same as emergence angles at which the sub-signal lights are emergent from the demultiplexer 116.

In addition, as shown in FIG. 2A, incidence points that are on the demultiplexer 116 and that are of signal light are on one side of a major axis of the lens 2, and incidence points that are on the second optical path changer 132 and that are of the sub-signal light are on the other side of the major axis of the lens 2.

As shown in FIG. 2B, the first optical path changer 118 and the second optical path changer 132 share a same lens 2, where the demultiplexer 116, the foregoing lens 2, the first optical switch array 120, and the second optical switch array 136 form a 4*f* system, that is, a distance that is in signal light transmission direction and that is from the demultiplexer 116 to the lens 2, a distance that is in the signal light transmission direction and that is from the first optical switch array 120 to the lens 2, and a distance that is in the signal light transmission direction and that is from the second optical switch array 136 to the lens 2 are all the focal length f of the lens 2, so that it can be ensured that, when a first optical switch unit deflects sub-signal light to any second optical switch unit in the second optical switch array 136, all incidence angles that are on the second optical switch unit and that are of the sub-signal light are the same as emergence angles at which the sub-signal light are emergent from the demultiplexer 116.

In addition, in FIG. 2B, signal light that is input from the input port 112 is presented as multiple beams that are parallel to each other. Therefore, the first optical path changer 118 further includes a cylindrical lens 1, where the cylindrical lens 1 is configured to converge, on the first plane (YOZ), target signal light that is parallel to each other, and make a convergence point located on the demultiplexer 116.

In addition, as shown in FIG. 2A, incidence points that are on the demultiplexer 116 and that are of signal light are on one side of the major axis of the lens 2, and incidence points that are on the second optical path changer 132 and that are of the sub-signal light are on the other side of the major axis of the lens 2.

In addition, it should be noted that, in FIG. 2A, a lens 1 is shown in a dashed line, which indicates that the lens 1 is ineffective on the plane (that is, the XOZ plane) shown in FIG. 2A. Similarly, in FIG. 2B, the first beam expander 114 is shown in a dashed line, which indicates that the first beam expander 114 is ineffective on the plane (that is, the YOZ plane) shown in FIG. 2B; the demultiplexer 116 is shown in a dashed line, which indicates that the demultiplexer 116 is ineffective on the plane (that is, the YOZ plane) shown in FIG. 2B; the second beam expander 134 is shown in a dashed line, which indicates that the second beam expander 134 is ineffective on the plane (that is, the YOZ plane) shown in FIG. 2B. In the following, to avoid repeated descriptions, in a case in which no special description is provided, if components are shown in dashed lines in accompanying drawings, it indicates that the components are ineffective on the planes shown in the accompanying drawings.

Configuration Manner 2

FIG. 3A shows a schematic top view of another example of configuration of an optical communications apparatus 100 according to an embodiment of the present invention. FIG. 3B is a schematic side view of the configuration of the optical communications apparatus shown in FIG. 3A.

The configuration manner shown in FIG. 3A and FIG. 3B is different from the configuration manner 1 in that, the foregoing multiplexer 133 is configured, so that the second optical switch array 136 does not need to two-dimensionally rotate.

Accordingly, in the manner 2, the multiplexer 133 is located at a position of the second optical switch array 136 in the manner 1, and the second optical switch array 136 is configured behind the second beam expander 134.

Configuration Manner 3

Figure 4A:
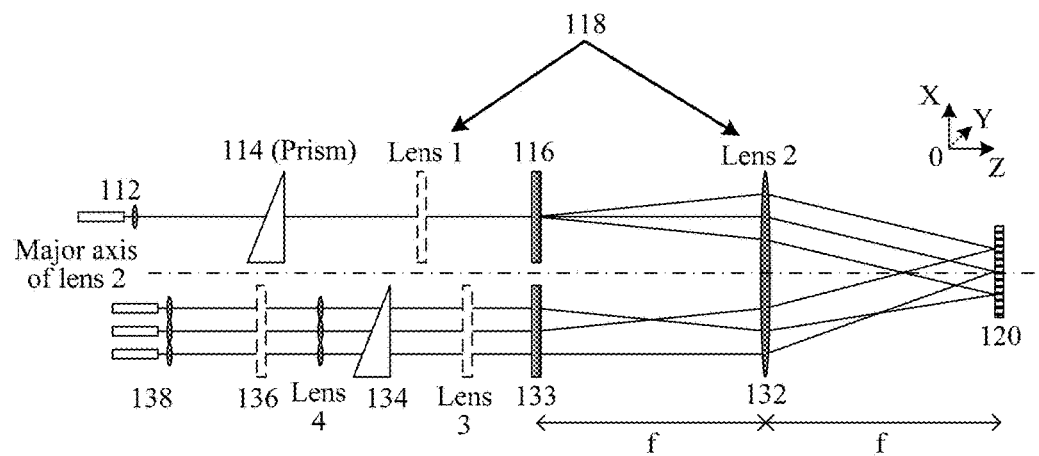
FIG. 4A is a schematic top view of configuration of an optical communications apparatus according to still another embodiment of the present invention.
Figure 4B:
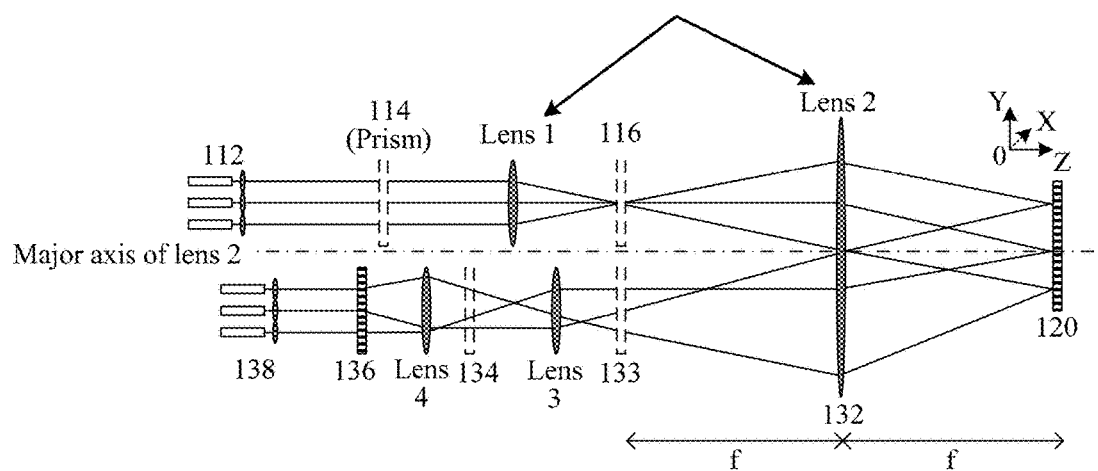
FIG. 4B is a schematic side view of the configuration of the optical communications apparatus shown in FIG. 4A.

FIG. 4A shows a schematic top view of another example of configuration of an optical communications apparatus 100 according to an embodiment of the present invention. FIG. 4B is a schematic side view of the configuration of the optical communications apparatus shown in FIG. 4A.

The configuration manner shown in FIG. 4A and FIG. 4B is different from the configuration manner 2 in that, in addition to a prism, a cylindrical lens 3 and a lens 4 are further configured for the second beam expander 134.

The cylindrical lens 3 is configured to adjust a beam waist position that is on the YOZ plane and that is of signal light emergent from the second optical switch array 136, so that the beam waist position corresponds to a beam waist position that is on the YOZ plane and that is of signal light emergent from the input port 112.

The lens 4 is configured to adjust a beam waist position that is on the XOZ plane and that is of signal light emergent from the second optical switch array 136, so that the beam waist position corresponds to a beam waist position that is on the XOZ plane and that is of signal light emergent from the input port 112.

Configuration Manner 4

Figure 5A:
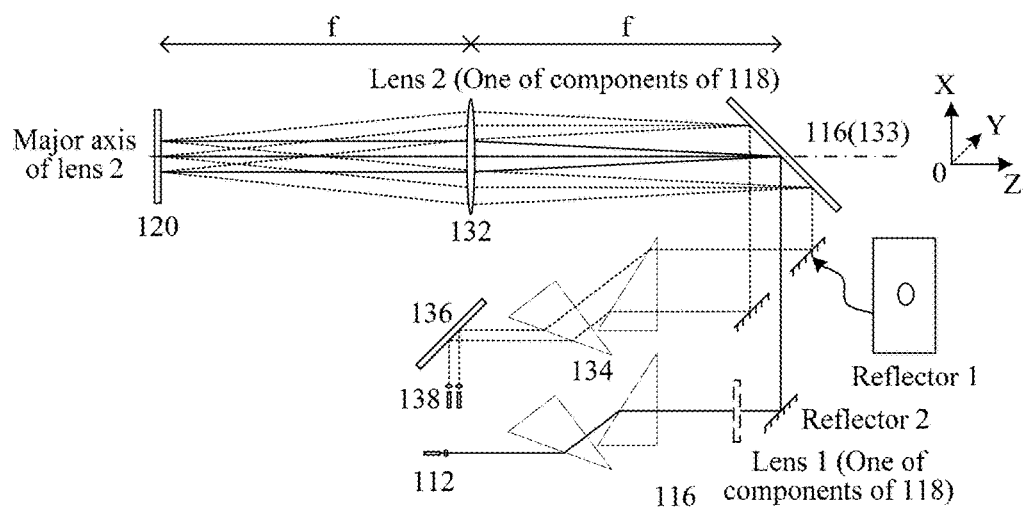
FIG. 5A is a schematic top view of configuration of an optical communications apparatus according to still another embodiment of the present invention.
Figure 5B:
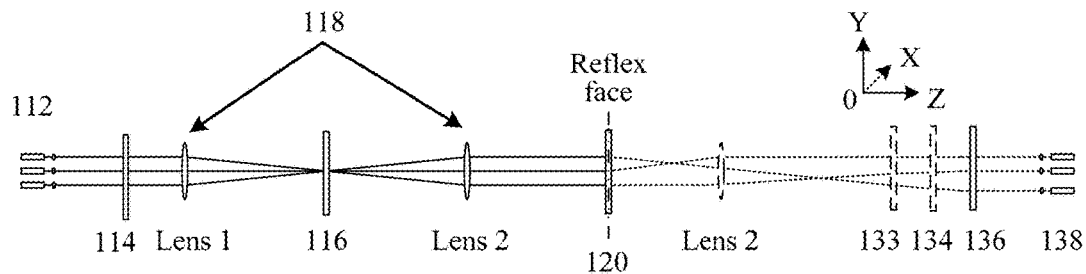
FIG. 5B is a schematic side view of the configuration of the optical communications apparatus shown in FIG. 5A.

FIG. 5A shows a schematic top view of another example of configuration of an optical communications apparatus 100 according to an embodiment of the present invention. FIG. 5B is a schematic side view of the configuration of the optical communications apparatus shown in FIG. 5A.

Optionally, the first optical path changer and the second optical path changer are at least one lens.

Optionally, the first optical path changer and the second optical path changer share the at least one lens.

Optionally, when the first optical path changer and the second optical path changer share one lens, on the third plane, an incidence point that is on the demultiplexer and that is of the target signal light is located on an axial line that is in the main axis direction and that is of the first optical path changer.

Optionally, when the first optical path changer and the second optical path changer share one lens, on the first plane, an incidence point that is on the demultiplexer and that is of the target signal light is located on an axial line that is in the main axis direction and that is of the first optical path changer.

Specifically, the configuration manner shown in FIG. 5A and FIG. 5B is different from the configuration manner 2 in that, a reflector 1 and a reflector 2 are set.

The reflector 2 is configured to reflect, by using a transmission hole in the center of the reflector 1, signal light that is emergent from the first beam expander 114 and that is transmitted by using the cylindrical lens 1, to the demultiplexer 116.

The reflector 1 is configured to reflect, by using an area except the transmission hole, signal light incident from the multiplexer 133 (which shares a same grating with the demultiplexer 116), to the second beam expander 134.

Therefore, on the XOZ plane and the YOZ plane, incidence points that are on the foregoing multiplexer 133 and that are of signal light are both on the major axis of the lens 2.

It should be noted that, for convenience of understanding, FIG. 5B shows a state after an actually configured light path is reflexed by using the first optical switch array as the center (reflex face), where the lens 2 to the right of the first optical switch array is a same component as the lens 2 to the left of the first optical switch array, and is shown in dashed lines to embody light paths.

In addition, in FIG. 5A and FIG. 5B, input signal light propagated in an input system is shown in solid lines, and output signal light propagated in an output system is shown in dashed lines.

Configuration Manner 5

Figure 6A:
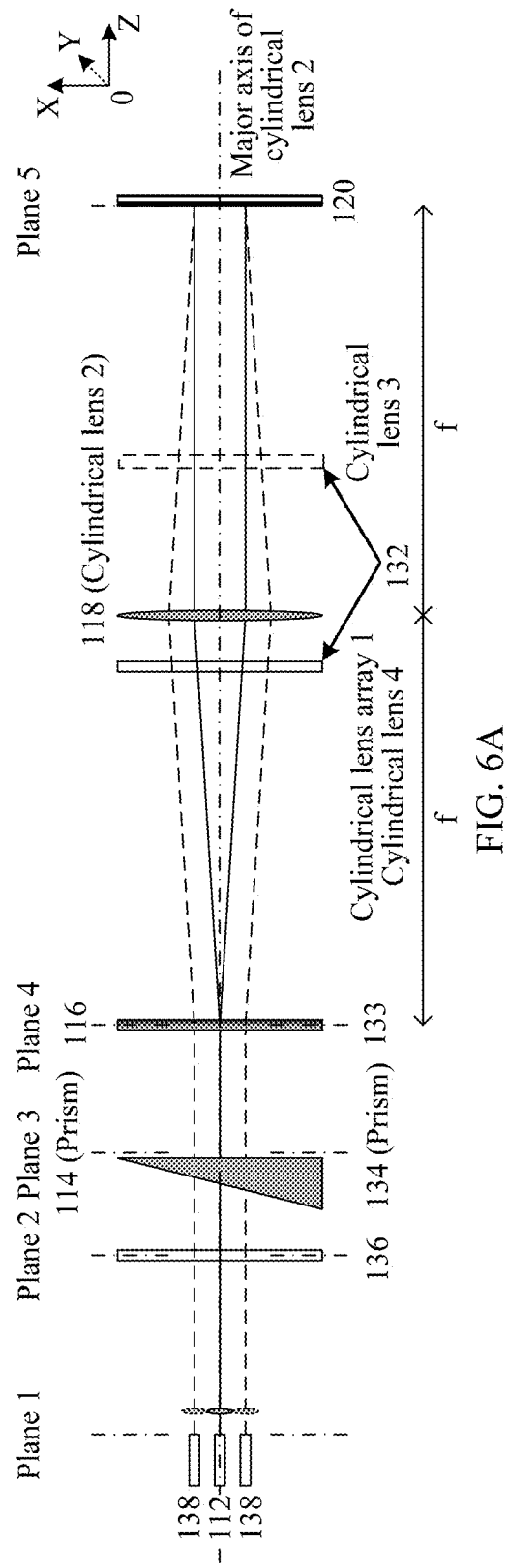
FIG. 6A is a schematic top view of configuration of an optical communications apparatus according to still another embodiment of the present invention.
Figure 6B:
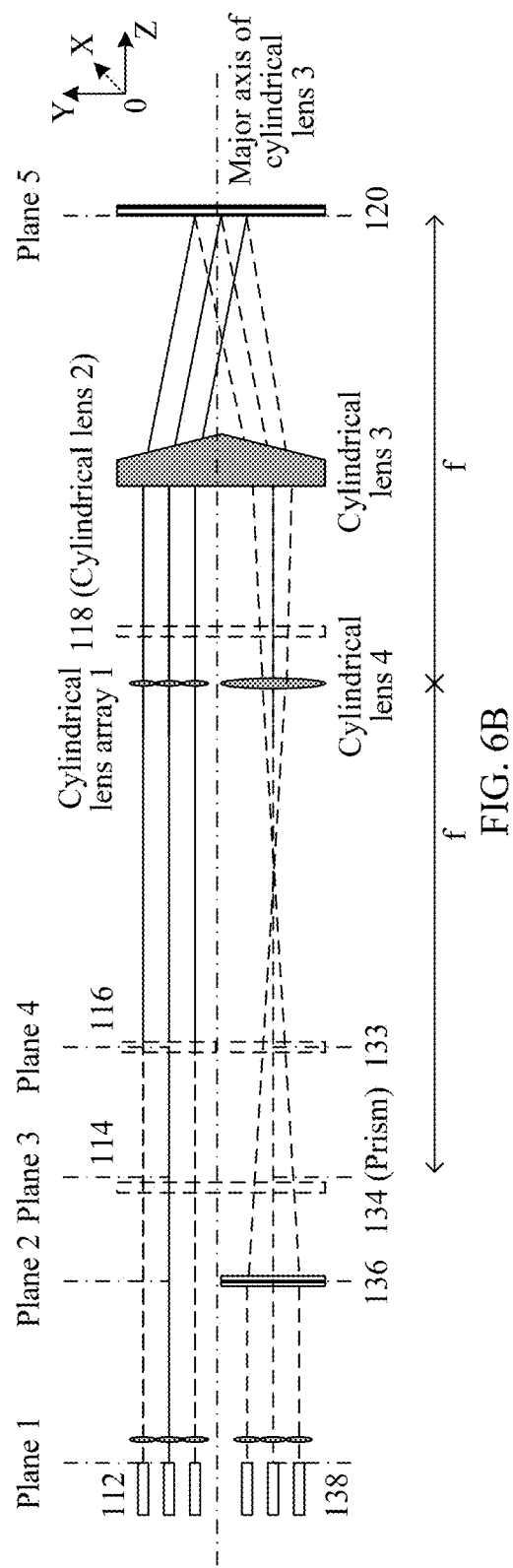
FIG. 6B is a schematic side view of the configuration of the optical communications apparatus shown in FIG. 6A.

FIG. 6A shows a schematic top view of another example of configuration of an optical communications apparatus 100 according to an embodiment of the present invention. FIG. 6B is a schematic side view of the configuration of the optical communications apparatus shown in FIG. 6A.

Optionally, the First Optical Path Changer Includes:

at least one first cylindrical lens, configured to change propagation directions that are on the third plane and that are of the sub-target signal lights; and the second optical path changer includes:

at least one second cylindrical lens, configured to change propagation directions that are on the first plane and that are of the sub-target signal lights;

at least one third cylindrical lens, configured to adjust, to the first optical switch array, a beam waist position that is on the first plane and that is of the target signal light output from the first cylindrical lens module; and at least one fourth cylindrical lens, configured to adjust beam waist positions that are on the first plane and that are of sub-target signal lights output from the first optical switch array, to correspond to a beam waist position that is on the first plane, between the output port and the demultiplexer, and of the target signal light that is output from the input port.

Specifically, as shown in FIG. 6A and FIG. 6B, on the XOZ plane, a role of a cylindrical lens 2 (a first cylindrical lens) is similar to a role of the lens 2 in the configuration manner 1.

On the YOZ plane, a role of a cylindrical lens 3 (a second cylindrical lens) is similar to a role of the lens 2 in the configuration manner 1.

On the YOZ plane, a cylindrical lens array 1 (a third cylindrical lens) is configured to adjust a beam waist position of signal light emergent from the cylindrical lens 2, to the first optical switch array 120, and specifically to a position of a plane 5 in FIG. 6A.

On the YOZ plane, a cylindrical lens 4 (a fourth cylindrical lens) is configured to adjust a beam waist position that is on the YOZ plane and that is of signal light emergent from the second optical switch array 136, so that the beam waist position corresponds to a beam waist position that is on the YOZ plane and that is of signal light emergent from the input port 112, and specifically to a position of a plane 3 in FIG. 6A and FIG. 6B.

In addition, in FIG. 6A and FIG. 6B, input signal light propagated in an input system is shown in solid lines, and output signal light propagated in an output system is shown in dashed lines.

As shown in FIG. 6A, on the third plane (the XOZ plane), incidence points that are on the multiplexer 133 and that are of signal light are located on the major axis of the cylindrical lens 2. In addition, as shown in FIG. 6B, on the first plane (the YOZ plane), an incidence point that is on the cylindrical lens 3 and that is of signal light that is from an input port and input into the cylindrical lens 3 is located on one side of the major axis of the cylindrical lens 2, and an incidence point that is on the cylindrical lens 3 and that is of signal light that is from the first optical switch array 120 and input into the cylindrical lens 3 is located on the other side of the major axis of the cylindrical lens 2.

In this embodiment of the present invention, the cylindrical lens 2 and the cylindrical lens 3 may be configured co-axially, that is, the major axis of the cylindrical lens 2 coincides with the major axis of the cylindrical lens 3.

Configuration Manner 6

Figure 7A:
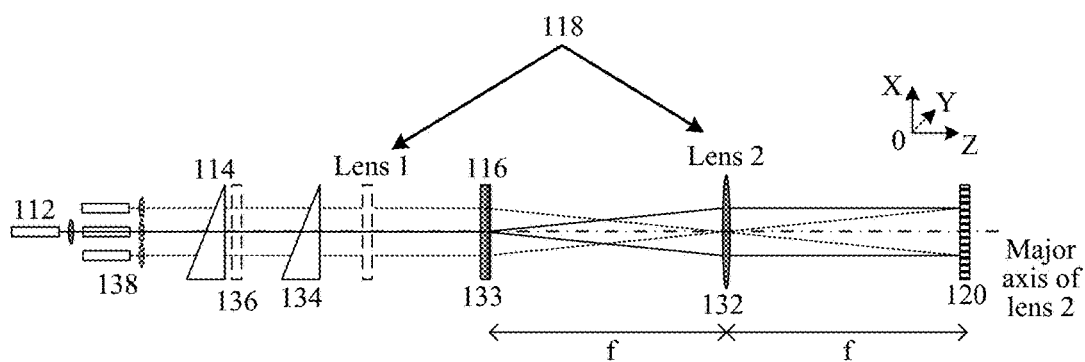
FIG. 7A is a schematic top view of configuration of an optical communications apparatus according to still another embodiment of the present invention.
Figure 7B:
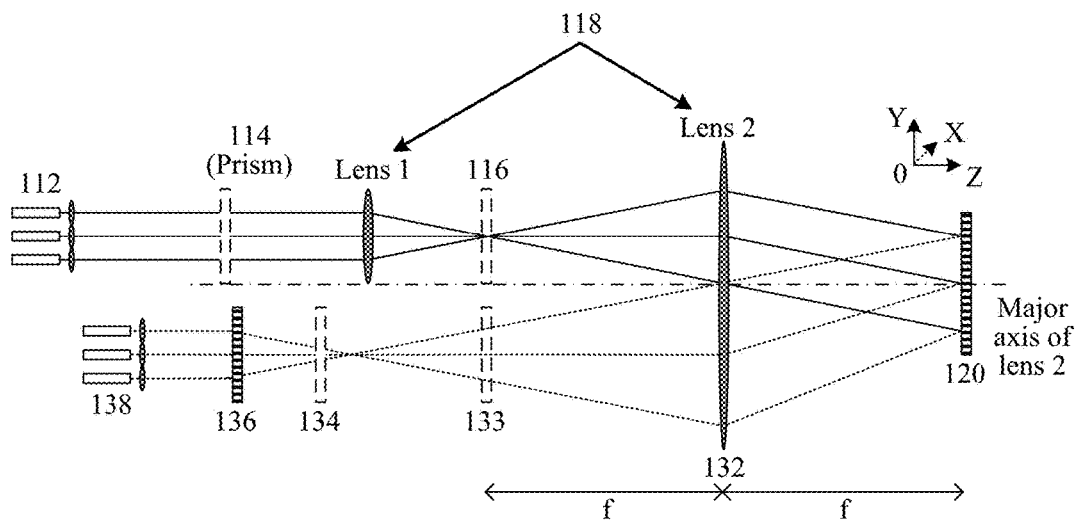
FIG. 7B is a schematic side view of the configuration of the optical communications apparatus shown in FIG. 7A.

FIG. 7A shows a schematic top view of another example of configuration of an optical communications apparatus 100 according to an embodiment of the present invention. FIG. 7B is a schematic side view of the configuration of the optical communications apparatus shown in FIG. 7A.

Optionally, the first optical path changer and the second optical path changer are at least one lens.

Optionally, the first optical path changer and the second optical path changer share the at least one lens.

Optionally, when the first optical path changer and the second optical path changer share one lens, on the third plane, an incidence point that is on the demultiplexer and that is of the target signal light is located on an axial line that is in the main axis direction and that is of the first optical path changer.

Optionally, when the first optical path changer and the second optical path changer share one lens, on the first plane, an incidence point that is on the demultiplexer and that is of the target signal light is not located on an axial line that is in the main axis direction and that is of the first optical path changer.

Specifically, the configuration manner shown in FIG. 7A and FIG. 7B is different from the configuration manner 2 in that, on the XOZ plane, an incidence point that is on the foregoing multiplexer 133 and that is of signal light is located on the major axis of the lens 2.

In addition, in FIG. 7A and FIG. 7B, input signal light propagated in an input system is shown in solid lines, and output signal light propagated in an output system is shown in dashed lines.

Configuration Manner 7

Figure 8A:
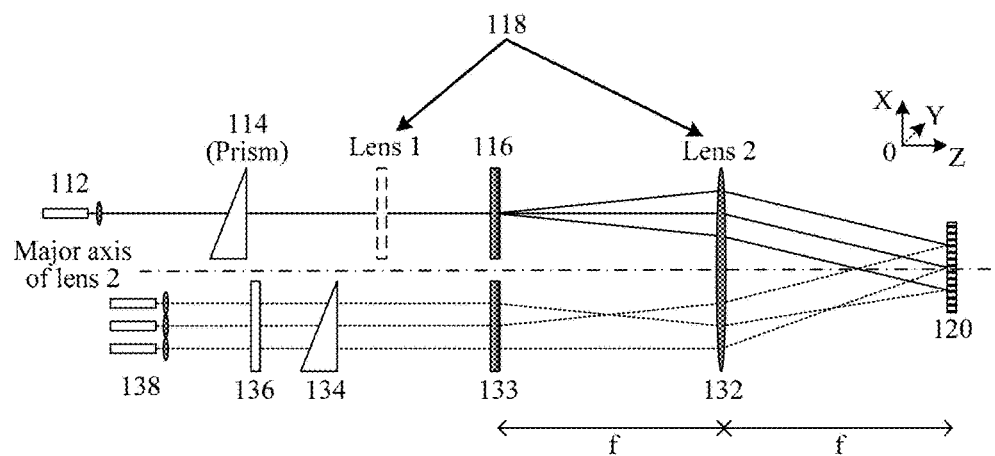
FIG. 8A is a schematic top view of configuration of an optical communications apparatus according to still another embodiment of the present invention.
Figure 8B:
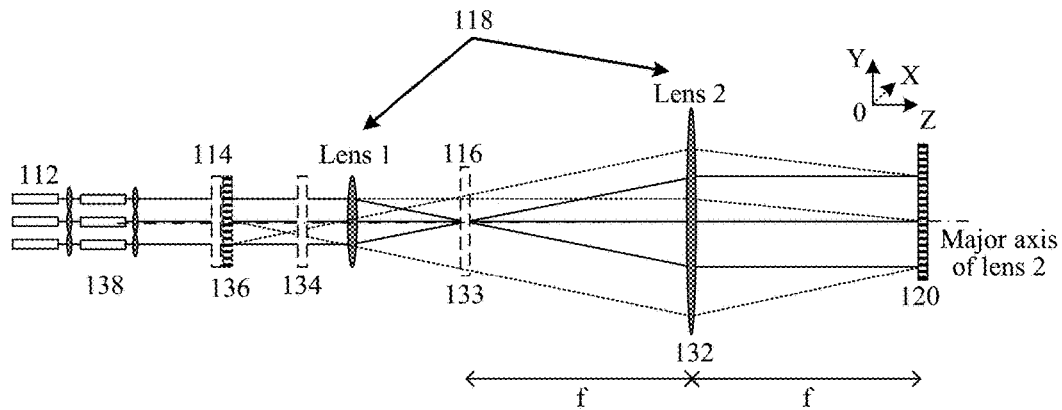
FIG. 8B is a schematic side view of the configuration of the optical communications apparatus shown in FIG. 8A.

FIG. 8A shows a schematic top view of another example of configuration of an optical communications apparatus 100 according to an embodiment of the present invention. FIG. 8B is a schematic side view of the configuration of the optical communications apparatus shown in FIG. 8A.

Optionally, the first optical path changer and the second optical path changer are at least one lens.

Optionally, the first optical path changer and the second optical path changer share the at least one lens.

Optionally, when the first optical path changer and the second optical path changer share one lens, on the third plane, an incidence point that is on the demultiplexer and that is of the target signal light is not located on an axial line that is in the main axis direction and that is of the first optical path changer.

Optionally, when the first optical path changer and the second optical path changer share one lens, on the first plane, an incidence point that is on the demultiplexer and that is of the target signal light is located on an axial line that is in the main axis direction and that is of the first optical path changer.

Specifically, the configuration manner shown in FIG. 8A and FIG. 8B is different from the configuration manner 2 in that, on the YOZ plane, an incidence point that is on the foregoing multiplexer 133 and that is of signal light is located on the major axis of the lens 2.

In addition, in FIG. 8A and FIG. 8B, input signal light propagated in an input system is shown in solid lines, and output signal light propagated in an output system is shown in dashed lines.

Configuration Manner 7

Figure 9:
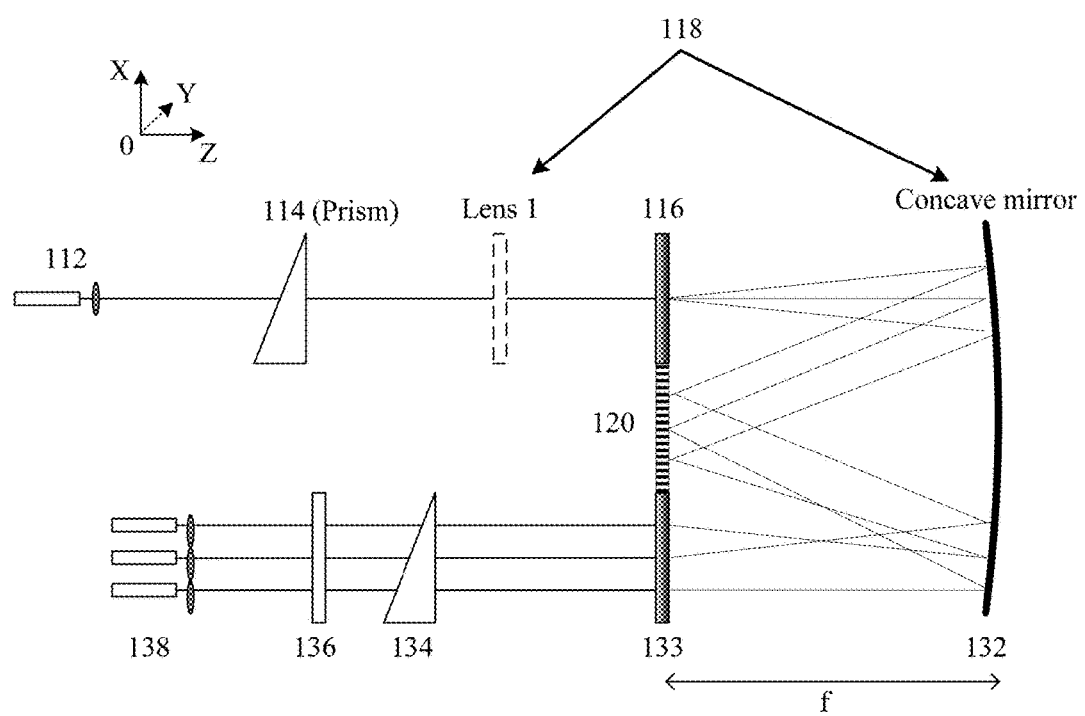
FIG. 9 is a schematic top view of configuration of an optical communications apparatus according to still another embodiment of the present invention.

FIG. 9 shows a schematic top view of another example of configuration of an optical communications apparatus 100 according to an embodiment of the present invention.

Optionally, the first optical path changer and the second optical path changer include at least one concave mirror.

Optionally, the first optical path changer and the second optical path changer share the at least one concave mirror.

Specifically, as shown in FIG. 9, the first optical path changer 118 and the second optical path changer 132 share a same concave mirror, where the demultiplexer 116, the foregoing concave mirror, the first optical switch array 120, and the multiplexer 133 form a 4$f$ system, that is, a distance that is in signal light transmission direction and that is from the demultiplexer 116 to the concave mirror, a distance that is in the signal light transmission direction and that is from the first optical switch array 120 to the concave mirror, and a distance that is in the signal light transmission direction and that is from the multiplexer 133 to the concave mirror are all a focal length f of the concave mirror, so that it can be ensured that, when a first optical switch unit deflects sub-signal light to any position in the multiplexer 133, all incidence angles that are on the multiplexer 133 and that are of the sub-signal light are the same as emergence angles at which the sub-signal light are emergent from the demultiplexer 116.

In addition, as shown in FIG. 9, incidence points that are on the demultiplexer 116 and that are of signal light are on one side of the major axis of the lens 2, and incidence points that are on the multiplexer 133 and that are of the sub-signal light are on the other side of the major axis of the lens 2.

It should be noted that, as shown in FIG. 9, the first optical path changer 118 includes the lens 1 and the foregoing concave mirror. A role of the lens 1 in FIG. 9 is similar to, for example, a role of the lens 1 in FIG. 2A. Herein, to avoid repeated descriptions, descriptions about the lens 1 are omitted.

By means of the optical communications apparatus in the embodiments of the present invention, a first beam expander is set, and beam expansion processing is performed on signal light by using the first beam expander, so that a flare that is of the signal light incident into a second optical switch array and that is on a configuration plane of the second optical switch array can be changed from a circle to an ellipse, where a major axis length of the elliptical flare that is generated after the beam expansion processing can satisfy a demultiplexing processing requirement, and because a minor axis length of the ellipse is less than the major axis length of the ellipse, more second optical switch units can be configured, in a minor axis direction of the ellipse, for the second optical switch array, and then more output ports can be provided; in addition, first optical switch units two-dimensionally rotate, and one second optical switch unit is configured to receive, within a same period of time, only one piece of sub-signal light that is from a same input port, so that M second optical switch units do not need to be one-dimensionally arranged, and then two-dimensional arrangement of M output ports can be implemented. Therefore, a network cross connect capability for an output end can be improved within given limited configuration space, and network needs and user requirements can be satisfied.

In the foregoing, the optical communications method in the embodiments of the present invention is described in detail with reference to FIG. 1 to FIG. 9. In the following, an optical communications method in the embodiments of the present invention is described in detail with reference to FIG. 10.

FIG. 10 is a schematic flowchart of an optical communications method 200 according to an embodiment of the present invention. The method 200 is performed in an apparatus that includes an input system, a first optical switch array, and an output system, where the input system includes N input ports that are one-dimensionally arranged on a first plane, and a demultiplexer; the first optical switch array includes N×K first optical switch units that are two-dimensionally arranged on a second plane, where K is a quantity of sub-signal lights that are included in signal light, center wavelengths of the sub-signal lights are different from each other, the second plane is perpendicular to a main axis direction, the main axis direction is a transmission direction of signal light that is output from the input ports, the first plane is perpendicular to the second plane, the first optical switch units can rotate in a first axial line direction and a second axial line direction, the first axial line direction is a direction of an intersecting line between the first plane and the second plane, the second axial line direction is a direction of an intersecting line between a third plane and the second plane, the third plane is perpendicular to the second plane, the third plane is perpendicular to the first plane, one first optical switch unit is configured to receive only one beam of sub-signal light that is from one input port, and input ports or sub-signal lights corresponding to the first optical switch units are different from each other; and the output system includes a second optical switch array, and M output ports that are two-dimensionally arranged, where the second switch array includes M second optical switch units that are two-dimensionally arranged, one second optical switch unit is configured to receive, within a same period of time, only one piece of sub-signal light that is from a same input port, the second optical switch units can rotate at least in the second axial line direction, and the second optical switch units correspond one-to-one to the output ports, where the method 200 includes:

S210: Receive target signal light by using a target input port, where a flare of the target signal light is a circle, and the target signal light includes at least two beams of sub-target signal lights.

S220: Perform first beam expansion processing on the target signal light, so as to change the flare that is in a direction of the second plane and that is of the target signal light from the circle to an ellipse, where a major axis direction of the ellipse is the second axial line direction, a minor axis direction of the ellipse is the first axial line direction, and a major axis length of the ellipse is determined based on the following parameters:

bandwidth of the target signal light, a spacing between adjacent sub-target signal lights of the at least two beams of sub-target signal lights, center wavelengths of the at least two beams of sub-target signal lights, and diffraction parameters of the demultiplexer.

S230: Perform demultiplexing processing on the target signal light by using the demultiplexer, to obtain the at least two beams of sub-target signal lights by splitting the target signal light, so that the sub-target signal lights disperse on the third plane.

S240: Perform first optical path change processing on the sub-target signal lights, so that the sub-target signal lights are incident, parallel to each other, into corresponding first optical switch units.

S250: Based on output ports corresponding to the sub-target signal lights, control rotation of the first optical switch units that correspond to the sub-target signal lights and that are in the first optical switch array, so as to transmit the sub-target signal lights to corresponding second optical switch units.

S260: Perform second optical path change processing on the sub-target signal lights, so that a projection that is on the third plane and that is of the sub-target signal light on which the second optical path change processing has been performed is parallel to a projection that is on the third plane and that is of the corresponding sub-target signal light before the first optical path change processing.

S270: Perform second beam expansion processing on the sub-target signal lights, so as to change flares that are in the direction of the second plane and that are of the sub-target signal lights from ellipses to circles, where diameters of the circles are determined based on a transmission requirement of the output ports.

S280: Control rotation of the second optical switch units that correspond to the sub-target signal lights and that are in the second optical switch array, so as to transmit the sub-target signal lights to corresponding output ports.

Optionally, the method 200 further includes:

when for one output port, there are at least two beams of sub-target signal lights that need to be received, combining, by using a multiplexer, the at least two beams of sub-target signal lights that need to be received into one beam of signal light, and transmitting the one beam of signal light to the second optical switch array; or when for one output port, there is only one beam of sub-target signal lights that needs to be received, adjusting, by using the multiplexer, optical power distribution within a bandwidth range of the sub-target signal lights.

Optionally, the performing first beam expansion processing on the target signal light includes:

performing first beam expansion processing on the target signal light, so that a beam waist position that is on the third plane and that is of the target signal light before the first optical path change processing is located on the demultiplexer.

Optionally, the performing second beam expansion processing on the sub-target signal lights includes:

performing second beam expansion processing on the sub-target signal lights, so that beam waist positions that are on the third plane and that are of the sub-target signal lights on which the second beam expansion processing has been performed are located on the output ports.

An entity for implementing the optical communications method 200 according to this embodiment of the present invention may correspond to the optical communications apparatus 100 according to the embodiment of the present invention. In addition, action bodies of procedures in the optical communications method 200 and the foregoing other operations respectively correspond to the modules and units of the apparatus 100 in FIG. 1 to FIG. 9. For conciseness, details are not described herein again.

By means of the optical communications method in this embodiment of the present invention, a first beam expander is set, and beam expansion processing is performed on signal light by using the first beam expander, so that a flare that is of the signal light incident into a second optical switch array and that is on a configuration plane of the second optical switch array can be changed from a circle to an ellipse, where a major axis length of the elliptical flare that is generated after the beam expansion processing can satisfy a demultiplexing processing requirement, and because a minor axis length of the ellipse is less than the major axis length of the ellipse, more second optical switch units can be configured, in a minor axis direction of the ellipse, for the second optical switch array, and then more output ports can be provided; in addition, first optical switch units two-dimensionally rotate, and one second optical switch unit is configured to receive, within a same period of time, only one piece of sub-signal light that is from a same input port, so that M second optical switch units do not need to be one-dimensionally arranged, and then two-dimensional arrangement of M output ports can be implemented. Therefore, a network cross connect capability for an output end can be improved within given limited configuration space, and network needs and user requirements can be satisfied.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of the present invention essentially, or the part contributable to the prior art, or some of the technical solutions may be implemented in a form of a software product. The computer software product may be stored in a storage medium, and may include several instructions for instructing a computer device (which may be a personal computer, a server, a network device, or the like) to perform all or some of the steps of the methods described in the embodiments of the present invention. The foregoing storage medium may include: any medium that can store program code, such as a USB flash drive, a removable hard disk, a read-only memory (ROM), a random access memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical communications apparatus comprising: an input system, a first optical switch array, and an output system, wherein the input system comprises N input ports that are one-dimensionally arranged on a first plane, a first beam expander, a demultiplexer, and a first optical path changer; the first optical switch array comprises N×K first optical switch units that are two-dimensionally arranged on a second plane, wherein K is a quantity of sub-signal lights that are comprised in signal light, center wavelengths of the sub-signal lights are different from each other, the second plane is perpendicular to a main axis direction, the main axis direction is a transmission direction of signal light that is output from the input ports, the first plane is perpendicular to the second plane, the first optical switch units can rotate in a first axial line direction and a second axial line direction, the first axial line direction is a direction of an intersecting line between the first plane and the second plane, the second axial line direction is a direction of an intersecting line between a third plane and the second plane, the third plane is perpendicular to the second plane, the third plane is perpendicular to the first plane, one first optical switch unit is configured to receive only one beam of sub-signal light that is from one input port, and input ports and sub-signal lights corresponding to the first optical switch units are different from each other; and the output system comprises a second optical path changer, a second beam expander, a second optical switch array, and M output ports that are two-dimensionally arranged, wherein the second switch array comprises M second optical switch units that are two-dimensionally arranged, one second optical switch unit is configured to receive, within a same period of time, only sub-signal lights that are from a same input port, the second optical switch units can rotate at least in the second axial line direction, and the second optical switch units correspond one-to-one to the output ports, wherein a target input port of the N input ports is configured to: when receiving target signal light, transmit the target signal light to the first beam expander, wherein a flare of the target signal light that is output by the target input port is a circle, and the target signal light comprises at least two beams of sub-target signal lights;

the first beam expander is configured to perform first beam expansion processing on the target signal light, to change the flare that is of the target signal light and in a direction of the second plane from the circle to an ellipse, and transmit the target signal light on which the first beam expansion processing has been performed to the demultiplexer, wherein a major axis direction of the ellipse is the second axial line direction, a minor axis direction of the ellipse is the first axial line direction, and a major axis length of the ellipse is determined based on the following parameters:

bandwidth of the target signal light, a spacing between adjacent sub-target signal lights of the at least two beams of sub-target signal lights, center wavelengths of the at least two beams of sub-target signal lights, and diffraction parameters of the demultiplexer;

the demultiplexer is configured to perform demultiplexing processing on the target signal light, to obtain the at least two beams of sub-target signal lights by splitting the target signal light, so that the sub-target signal lights disperse on the third plane, and transmit the sub-target signal lights to corresponding first optical switch units by using the first optical path changer;

the first optical path changer is configured to perform first optical path change processing on the sub-target signal lights, so that the sub-target signal lights are incident, parallel to each other, into the corresponding first optical switch units;

the first optical switch array is configured to: based on output ports corresponding to the sub-target signal lights, control rotation of the first optical switch units corresponding to the sub-target signal lights, so as to transmit the sub-target signal lights to corresponding second optical switch units by using the second optical path changer and the second beam expander;

the second optical path changer is configured to perform second optical path change processing on the sub-target signal lights, wherein a projection that is of the sub-target signal light and on the third plane, on which the second optical path change processing has been performed, is parallel to a projection that is of the corresponding sub-target signal light and on the third plane before the first optical path change processing;

the second beam expander is configured to perform second beam expansion processing on the sub-target signal lights, so as to change flares that are of the sub-target signal lights and in the direction of the second plane from ellipses to circles, wherein diameters of the circles are determined based on a transmission requirement of the output ports; and the second optical switch array is configured to control rotation of the second optical switch units corresponding to the sub-target signal lights, to transmit the sub-target signal lights to the corresponding output ports.

2. The optical communications apparatus according to claim 1, wherein the output system further comprises:
a multiplexer, located between the second optical path changer and the second beam expander, and configured to:
when, for one output port, there are at least two beams of sub-target signal lights that need to be received, combine the at least two beams of sub-target signal lights that need to be received into one beam of signal light, and transmit the one beam of signal light to the second optical switch array by using the second beam expander; and
when, for one output port, there is only one beam of sub-target signal light that needs to be received, adjust optical power distribution within a bandwidth range of the sub-target signal light.

3. The optical communications apparatus according to claim 2, wherein the demultiplexer and the multiplexer comprise at least one grating.

4. The optical communications apparatus according to claim 3, wherein the multiplexer and the demultiplexer share the at least one grating.

5. The optical communications apparatus according to claim 1, wherein the first beam expander is configured to perform first beam expansion processing on the target signal light, so that a beam waist position that is of the target signal light, on the third plane, and between the first beam expander and the first optical path changer is located on the demultiplexer.

6. The optical communications apparatus according to claim 1, wherein the second beam expander is configured to perform second beam expansion processing on the sub-target signal lights, so that beam waist positions that are of the sub-target signal lights output from the second beam expander and on the third plane are located on the output ports.

7. The optical communications apparatus according to claim 1, wherein the first optical path changer and the second optical path changer comprise at least one lens.

8. The optical communications apparatus according to claim 7, wherein the first optical path changer and the second optical path changer share the at least one lens.

9. The optical communications apparatus according to claim 8, wherein when the first optical path changer and the second optical path changer share one lens,
on the third plane, an incidence point that is of the target signal light and on the demultiplexer is located on an axial line that is of the first optical path changer and in the main axis direction.

10. The optical communications apparatus according to claim 8, wherein when the first optical path changer and the second optical path changer share one lens,
on the third plane, an incidence point that is of the target signal light and on the demultiplexer is not located on an axial line that is of the first optical path changer and in the main axis direction.

11. The optical communications apparatus according to claim 8, wherein when the first optical path changer and the second optical path changer share one lens,
on the first plane, an incidence point that is of the target signal light and on the demultiplexer is located on an axial line that is of the first optical path changer and in the main axis direction.

12. The optical communications apparatus according to claim 8, wherein when the first optical path changer and the second optical path changer share one lens,
on the first plane, an incidence point that is of the target signal light and on the demultiplexer is not located on an axial line that is of the first optical path changer and in the main axis direction.

13. The optical communications apparatus according to claim 1, wherein the first optical path changer and the second optical path changer comprise at least one concave mirror.

14. The optical communications apparatus according to claim 13, wherein the first optical path changer and the second optical path changer share the at least one concave mirror.

15. The optical communications apparatus according to claim 1, wherein the first optical path changer comprises:
at least one first cylindrical lens, configured to change propagation directions that are of the sub-target signal lights and on the third plane; and
the second optical path changer comprises:
at least one second cylindrical lens, configured to change propagation directions that are of the sub-target signal lights and on the first plane;
at least one third cylindrical lens, configured to adjust, to the first optical switch array, a beam waist position that is of the target signal light output from the first cylindrical lens module and on the first plane; and
at least one fourth cylindrical lens, configured to adjust beam waist positions that are of sub-target signal lights output from the first optical switch array and on the first plane, to correspond to a beam waist position that is of the target signal light that is output from the input port and on the first plane, between the output port and the demultiplexer.

16. An optical communications method, wherein the method is performed in an apparatus that comprises an input system, a first optical switch array, and an output system, wherein the input system comprises N input ports that are one-dimensionally arranged on a first plane, and a demultiplexer; the first optical switch array comprises N×K first optical switch units that are two-dimensionally arranged on a second plane, wherein K is a quantity of sub-signal lights that are comprised in signal light, center wavelengths of the sub-signal lights are different from each other, the second plane is perpendicular to a main axis direction, the main axis direction is a transmission direction of signal light that is output from the input ports, the first plane is perpendicular to the second plane, the first optical switch units can rotate in a first axial line direction and a second axial line direction, the first axial line direction is a direction of an intersecting line between the first plane and the second plane, the second axial line direction is a direction of an intersecting line between a third plane and the second plane, the third plane is perpendicular to the second plane, the third plane is perpendicular to the first plane, one first optical switch unit is configured to receive only one beam of sub-signal light that is from one input port, and input ports and sub-signal lights corresponding to the first optical switch units are different from each other; and the output system comprises a second optical switch array, and M output ports that are two-dimensionally arranged, wherein the second switch array comprises M second optical switch units that are two-dimensionally arranged, one second optical switch unit is configured to receive, within a same period of time, only one piece of sub-signal light that is from a same input port, the second optical switch units can rotate at least in the second axial line direction, and the second optical switch units correspond one-to-one to the output ports, wherein the method comprises:
receiving target signal light by using a target input port, wherein a flare of the target signal light is a circle, and the target signal light comprises at least two beams of sub-target signal lights;
performing first beam expansion processing on the target signal light, so as to change the flare that is of the target signal light and in a direction of the second plane from the circle to an ellipse, wherein a major axis direction of the ellipse is the second axial line direction, a minor axis direction of the ellipse is the first axial line direction, and a major axis length of the ellipse is determined based on the following parameters:
bandwidth of the target signal light, a spacing between adjacent sub-target signal lights of the at least two beams of sub-target signal lights, center wavelengths of the at least two beams of sub-target signal lights, and diffraction parameters of the demultiplexer;
performing demultiplexing processing on the target signal light by using the demultiplexer, to obtain the at least two beams of sub-target signal lights by splitting the target signal light, so that the sub-target signal lights disperse on the third plane;
performing first optical path change processing on the sub-target signal lights, so that the sub-target signal lights are incident, parallel to each other, into the corresponding first optical switch units;
based on output ports corresponding to the sub-target signal lights, controlling rotation of the first optical switch units that correspond to the sub-target signal lights and that are in the first optical switch array, so as to transmit the sub-target signal lights to corresponding second optical switch units;
performing second optical path change processing on the sub-target signal lights, so that a projection that is of the sub-target signal light and on the third plane on which the second optical path change processing has been performed is parallel to a projection that is on the third plane and that is of the corresponding sub-target signal light before the first optical path change processing;
performing second beam expansion processing on the sub-target signal lights, so as to change flares that are in the direction of the second plane and that are of the sub-target signal lights from ellipses to circles, wherein diameters of the circles are determined based on a transmission requirement of the output ports; and
controlling rotation of the second optical switch units that correspond to the sub-target signal lights and that are in the second optical switch array, so as to transmit the sub-target signal lights to the corresponding output ports.

17. The optical communications method according to claim 16, wherein the method further comprises:
when, for one output port, there are at least two beams of sub-target signal lights that need to be received, combining the at least two beams of sub-target signal lights that need to be received into one beam of signal light, and transmitting the one beam of signal light to the second optical switch array; and
when, for one output port, there is only one beam of sub-target signal light that needs to be received, adjusting optical power distribution within a bandwidth range of the sub-target signal light.

18. The optical communications method according to claim 16, wherein the performing first beam expansion processing on the target signal light comprises:
performing first beam expansion processing on the target signal light, so that a beam waist position that is of the target signal light and on the third plane before the first optical path change processing is located on the demultiplexer.

19. The optical communications method according to claim 16, wherein the performing second beam expansion processing on the sub-target signal lights comprises:
performing second beam expansion processing on the sub-target signal lights, so that beam waist positions that are of the sub-target signal lights and on the third plane, on which the second beam expansion processing has been performed are located on the output ports.

* * * * *

UNITED STATES PATENT AND TRADEMARK OFFICE
CERTIFICATE OF CORRECTION

PATENT NO. : 9,641,917 B2
APPLICATION NO. : 15/331268
DATED : May 2, 2017
INVENTOR(S) : Yan et al.

It is certified that error appears in the above-identified patent and that said Letters Patent is hereby corrected as shown below:

In the Claims

Column 30, Line 45, Claim 9, "axial line is" should read -- axial line that is --.

Signed and Sealed this
Fifteenth Day of May, 2018

Andrei Iancu
*Director of the United States Patent and Trademark Office*